US012457030B2

(12) United States Patent
Esswie

(10) Patent No.: US 12,457,030 B2
(45) Date of Patent: *Oct. 28, 2025

(54) COVERAGE EXTENSION OF RANDOM ACCESS CHANNELS

(71) Applicant: Dell Products, L.P., Round Rock, TX (US)

(72) Inventor: Ali Esswie, Montreal (CA)

(73) Assignee: Dell Products L.P., Round Rock, TX (US)

( * ) Notice: Subject to any disclaimer, the term of this patent is extended or adjusted under 35 U.S.C. 154(b) by 345 days.

This patent is subject to a terminal disclaimer.

(21) Appl. No.: 17/959,944

(22) Filed: Oct. 4, 2022

(65) Prior Publication Data

US 2024/0113766 A1   Apr. 4, 2024

(51) Int. Cl.
*H04B 7/08* (2006.01)
*H04W 72/08* (2009.01)
(Continued)

(52) U.S. Cl.
CPC .......... *H04B 7/088* (2013.01); *H04W 72/542* (2023.01); *H04W 74/002* (2013.01); *H04W 74/0833* (2013.01); *H04W 76/10* (2018.02)

(58) Field of Classification Search
CPC ... H04B 7/008; H04W 76/10; H04W 74/0833
See application file for complete search history.

(56) References Cited

U.S. PATENT DOCUMENTS

2018/0310329 A1   10/2018  Yang et al.
2019/0053271 A1*   2/2019  Islam ................ H04W 74/0833
(Continued)

FOREIGN PATENT DOCUMENTS

WO       2023/055685       4/2023

OTHER PUBLICATIONS

Technical specifications (TS) 38.201—"5G; NR; Physical layer; General description", 3GPP TS 38.201 version 15.0.0 Release 15, Sep. 2018, 14 pages.
(Continued)

*Primary Examiner* — Derrick V Rose
(74) *Attorney, Agent, or Firm* — Amin, Turocy & Watson, LLP

(57) ABSTRACT

A radio access network node generates a physical random access channel configuration and transmits the configuration to a user equipment. The user equipment may use multiple and different uplink resources indicated in the configuration to transmit multiple preamble portions to the radio access network node based on signal strengths corresponding to available downlink beams. The preamble portions may be the same preamble, different preambles assigned in the configuration to a beam ranking index that are to be transmitted in different uplink resources associated with downlink beams ranked by the user equipment according to signal strength, or different parts of a long spread-preamble. The radio access network node may combine the preamble portions to obtain a single preamble or may request a strongest beam indication from the user equipment if a preamble portion was received in a signal corresponding to a less-than-strongest downlink beam available to the user equipment.

20 Claims, 20 Drawing Sheets

(51) Int. Cl.
*H04W 72/542* (2023.01)
*H04W 74/00* (2009.01)
*H04W 74/08* (2024.01)
*H04W 74/0833* (2024.01)
*H04W 76/10* (2018.01)

(56) References Cited

U.S. PATENT DOCUMENTS

| | | | |
|---|---|---|---|
| 2019/0174551 | A1 | 6/2019 | Liu et al. |
| 2019/0320430 | A1 | 10/2019 | Kim et al. |
| 2019/0327766 | A1 | 10/2019 | Zhang et al. |
| 2020/0296765 | A1* | 9/2020 | Kim ............... H04W 72/0446 |
| 2021/0051713 | A1 | 2/2021 | Hedayat et al. |
| 2021/0058971 | A1 | 2/2021 | MolavianJazi et al. |
| 2021/0266979 | A1* | 8/2021 | Zewail ................ H04L 5/0007 |
| 2021/0329692 | A1* | 10/2021 | Taherzadeh Boroujeni ............... H04L 27/2607 |
| 2021/0392699 | A1 | 12/2021 | Park |
| 2022/0123819 | A1* | 4/2022 | Taherzadeh Boroujeni ............... H04B 7/0695 |
| 2023/0043737 | A1 | 2/2023 | Pantelidou et al. |
| 2023/0043953 | A1* | 2/2023 | Dallal ............... H04W 56/001 |
| 2023/0345524 | A1 | 10/2023 | Bae et al. |
| 2024/0113765 | A1 | 4/2024 | Esswie |

OTHER PUBLICATIONS

Technical specifications (TS) 38.331—"5G; NR; Radio Resource Control (RRC); Protocol specification", 3GPP TS 38.331 version 16.1.0 Release 16, Jul. 2020, 886 pages.
Technical specifications (TS) 38.211—"5G; NR; Physical channels and modulation", 3GPP TS 38.211 version 16.2.0 Release 16, Jul. 2020, 136 pages.
Technical specifications (TS) 38.304—"5G; NR; User Equipment (UE) procedures in idle mode and in RRC Inactive state", 3GPP TS 38.304 version 16.1.0 Release 16, Jul. 2020, 41 pages.
Technical specifications (TS) 38.300—"5G; NR; NR and NG-RAN Overall description; Stage-2" 3GPP TS 38.300 version 16.4.0 Release 16, Jan. 2021, 151 pages.
International Search Report and Written Opinion for PCT Application No. PCT/US2023/034352 mailed Feb. 2, 2024, 22 pages.
Huawei, Southwest Jiatong University, Hisilicon—Yan Cheng et al: "Discussion on PRACH coverage enhancements", 3GPP Draft; R1-2300089; 3GPP TSG-RAN WG1 Meeting #112, Athens, GR, Feb. 17, 2023 , [https://www.3gpp.org/ftp/TSG_RAN/WG1_RL1/TSGR1_112/Docs/R1-2300089.zip], 21 pages.
International Search Report and Written Opinion for PCT Application No. PCT/US2023/034354 mailed Feb. 7, 2024, 22 pages.
Office Action mailed Dec. 12, 2024 for U.S. Appl. No. 17/959,935, 40 pages.
Notification Concerning Transmittal of International Preliminary Report on Patentability for PCT Application No. PCT/US2023/034352 mailed Apr. 17, 2025, 15 pages.
European Office Action mailed May 13, 2025 for European Patent Application No. 23801571.3, 3 pages.
Office Action mailed May 2, 2025 for U.S. Appl. No. 17/959,935, 75 pages.
Notification Concerning Transmittal of International Preliminary Report on Patentability for PCT Application No. PCT/US2023/034354 mailed Apr. 17, 2025, 15 pages.
European Office Action mailed May 13, 2025 for European Patent Application No. 23801572.1, 3 pages.
Office Action mailed Aug. 28, 2025 for U.S. Appl. No. 17/959,935, 92 pages.

* cited by examiner

```
┌─────────────────────────────────────────────────────────────────────┐
│   wherein the random access channel configuration comprises a random│
│   access channel long-sequence preamble indication that indicates a spread-│
│   preamble format and spread-preambles generated according to the spread-│
│   preamble format, wherein the first random access channel preamble portion│
│   corresponds to a first part of a first spread-preamble and the second random│
│   access channel preamble portion corresponds to a second part of the first│
│   spread-preamble, wherein the first random access channel preamble portion│
│   is orthogonal to random access channel preambles that are not generated│
│   according to the spread-preamble format, and wherein the random access│
│   channel configuration further comprises a set of configured non-spread-│
│   preamble first set portions, a set of configured spread-preamble first│
│   preamble portions, and a set of configured spread-preamble second│
│   preamble portions, the operations further comprising: analyzing the first│
│   random access channel preamble portion with respect to the set of│
│   configured spread-preamble first preamble portions and the set of configured│
│   non-spread-preamble first preamble portions to result in an analyzed first│
│   random access channel preamble portion and to determine that the first│
│   random access channel preamble portion corresponds to a spread-preamble│ 1935
└─────────────────────────────────────────────────────────────────────┘
                                    │
                                    ▼
┌─────────────────────────────────────────────────────────────────────┐
│ analyzing the second random access channel preamble portion with respect│
│ to the set of configured spread-preamble second preamble portions without│
│ analyzing the second random access channel preamble portion with respect│         1900
│ to the set of configured non-spread-preamble first preamble portions to result│ 1940
│          in an analyzed second random access channel preamble portion│
└─────────────────────────────────────────────────────────────────────┘
                                    │
                                    ▼
┌─────────────────────────────────────────────────────────────────────┐
│   combining the analyzed first random access channel preamble portion and│
│   the analyzed second random access channel preamble portion to result in a│
│     composite random access channel preamble that comprises one of the│
│                         spread-preambles                             │ 1945
└─────────────────────────────────────────────────────────────────────┘
                                    │
                                    ▼
┌─────────────────────────────────────────────────────────────────────┐
│   wherein the first random access channel preamble portion and the second│
│   random access channel preamble portion are received via the first random│
│     access channel resource and second random access channel resource,│
│   respectively, and wherein the first random access channel resource and│
│   second random access channel resource correspond to the first downlink│
│                                beam                                  │ 1950
└─────────────────────────────────────────────────────────────────────┘
```

FIG. 19B

COVERAGE EXTENSION OF RANDOM ACCESS CHANNELS

BACKGROUND

The 'New Radio' (NR) terminology that is associated with fifth generation ("5G") mobile wireless communication systems refers to technical aspects used in wireless radio access networks ("RAN"), and nodes thereof, that comprise several quality of service (QoS) classes, including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

Coverage extension optimization is desirable for 5G NR deployments, especially in cellular deployments where there is a misteach between downlink and uplink signal coverage due to differences between power of downlink beam signals transmitted from a RAN and power of corresponding uplink beam signals transmitted from user equipment. Accordingly, the lower power typically used to transmit uplink signals from a user equipment ("UE") results in a smaller geographical uplink coverage than corresponding downlink geographical coverage associated with a downlink beam that corresponding to a given uplink beam, thus resulting in reduced achievable uplink performance relative to achievable downlink performance for corresponding uplink and downlink beams respectively. Thus, uplink performance targets (e.g., key performance indicators ("KPI")) in wireless communication systems, such as fourth generation ("4G") Long Term Evolution ("LTE") systems, have been 'relaxed', or less demanding, relative to corresponding downlink performance KPIs. However, for 5G deployments, where more stringent quality of service targets relative to 4G LTE are desired, or in some cases specifically required, in both downlink and uplink directions, uplink coverage enhancements are desirable for uplink latency and reliability recovery performance. Physical random access channel ("PRACH") preamble transmission is used for connection establishment, handover, and beam failure recovery procedures. Procedures that increase, enhance, or optimize PRACH preamble coverage, or range, extension, are desirable.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, a method may comprise receiving, by a user equipment comprising a processor, a physical random access channel configuration, or a random access channel configuration, from a radio access node ("RAN"), wherein the random access channel configuration comprises a coverage criterion applicable to a coverage of the user equipment. The coverage criterion may be a configured value that corresponds to a signal strength of a downlink beam available to the user equipment that can support adequate, acceptable, satisfactory, or otherwise desirable performance, of transmitting a PRACH preamble from the user equipment to the RAN for establishing wireless communication service between the user equipment and the RAN. The configuration may comprise a first resource indication of a first random access channel resource and a second resource indication of a second random access channel resource.

The embodiment method may comprise determining, by the user equipment, a first coverage indication of a first coverage corresponding to a first downlink beam based on a downlink burst signal, such as burst signal that may correspond to a synchronization signal block transmission, received from the radio access node; determining, by the user equipment, based on the first coverage indication, that the first coverage fails to satisfy the coverage criterion (e.g., the signal strength of a strongest downlink beam of available downlink beams does not correspond to a signal strength value that is high enough to likely provide a desired level of performance in transmitting a PRACH preamble). The embodiment method may comprise transmitting, by the user equipment, a first random access channel preamble portion using the first random access channel resource corresponding to the first indication; and transmitting, by the user equipment, a second random access channel preamble portion using the second random access channel resource corresponding to the second indication.

In an embodiment, the first random access channel resource and the second random access channel resource may be associated with the first downlink beam. In an embodiment the first random access channel preamble portion and the second random access channel preamble portion are, or represent, the same preamble portion.

The first downlink beam may be, or may have, a strongest beam signal strength, or strongest measured or determined downlink signal strength value, of available downlink beams, wherein 'available' may refer to downlink beams transmitted from a RAN that the user equipment can detect or can use for potential communication with the RAN.

The random access channel configuration may comprise at least one random access channel preamble tuple comprising preambles associated with respective beam strength ranks of available downlink beams, wherein the first random access channel preamble portion of the tuple is associated with a first beam strength rank of the respective beam strength ranks (as determined by the user equipment based on beam strength signal measurement or value), and wherein the second random access channel preamble portion is associated with a second beam strength rank of the respective beam strength ranks (also as determined by the user equipment). The method may further comprise determining, by the user equipment, that the first downlink beam has a strongest beam strength of the available downlink beams based on the first coverage indication and that a second downlink beam has a second-strongest beam strength of the available downlink beams based on a second coverage indication corresponding to the second downlink beam; and determining, by the user equipment, that the first beam strength rank corresponds to the first downlink beam and that the second beam strength rank corresponds to the second downlink beam, wherein the first random access channel preamble portion is transmitted via the first random access channel resource corresponding to the first downlink beam or corresponding to the first random access channel resource, or wherein the second random access channel preamble portion is transmitted via the second random access channel resource corresponding to the second downlink beam, or corresponding to the second random access channel resource. In an embodiment the first random access channel preamble portion and the second random access channel preamble portion are different preamble portions.

In an embodiment, the random access channel configuration comprises a random access channel long-sequence preamble indication that indicates a spread-preamble, and wherein the first random access channel preamble portion is a first part of the spread-preamble and the second random access channel preamble portion is a second part of the spread-preamble. The first random access channel preamble portion is orthogonal to random access channel preambles that are not spread-preambles. The first downlink beam may be a beam that has a strongest beam strength from available downlink beams. In an embodiment, the first random access channel preamble portion and the second random access channel preamble portion are transmitted via the first random access channel resource and the second random access channel resource, respectively, which may correspond, respectively, the first downlink beam and the second downlink beam. The first resource indication may indicate: at least one first occasion index, at least one first timing resource indication, or at least one first frequency resource indication, and wherein the second resource indication may indicate: at least one second occasion index, at least one second timing resource indication, or at least one second frequency resource indication.

Another example embodiment method comprises generating, by a radio access node (e.g., RAN) comprising a processor, a random access channel configuration comprising a coverage criterion applicable to a coverage for a user equipment, a first resource indication of a first random access channel resource, and a second resource indication of a second random access channel resource; transmitting, by the radio access node, the random access channel configuration to the user equipment; receiving, from the user equipment, a first random access channel preamble portion via the first random access channel resource corresponding to the first resource indication; receiving, from the user equipment, a second random access channel preamble portion via the second random access channel resource corresponding to the second resource indication; and transmitting, by the radio access node, a connection establishment message signal to the user equipment via a first downlink beam that corresponds to the first random access channel resource.

In an embodiment the coverage criterion may comprise a value corresponding to a signal strength parameter to be used by the user equipment to determine whether a measured signal strength value corresponding to the signal strength parameter satisfies a minimum beam performance. The first random access channel resource and the second random access channel resource may be associated in the random access channel configuration with the first downlink beam, and the embodiment method may further comprise determining, by the radio access node based on the first random access channel resource and second random access channel resource being associated with the first downlink beam, that using the first downlink beam results in a stronger downlink beam strength signal as measured by the user equipment as compared to using other downlink beams corresponding to the radio access node that are available to the user equipment. The first random access channel preamble portion and the second random access channel preamble portion represent a same preamble portion. The RAN may combine an incomplete, or jumbled, version of the first random access channel preamble portion and an incomplete, or jumbled, version of the second random access channel preamble portion that may comprise a different jumbled than a jumbled part of the first preamble portion to result in a complete, unjumbled version of the same preamble portion.

In an embodiment, the random access channel configuration may further comprise at least one random access channel preamble tuple comprising preambles associated with respective beam strength ranks of available downlink beams, wherein the first random access channel preamble portion is associated with a first beam strength rank of the respective beam strength ranks, and wherein the second random access channel preamble portion is associated with a second beam strength rank of the respective beam strength ranks, the example method further comprising: detecting, by the radio access node, the first random access channel preamble portion from the first random access channel resource; and determining, by the radio access node, that using the first downlink beam results in a strongest measured signal strength at the user equipment.

In yet another embodiment, the random access channel configuration may further comprise at least one random access channel preamble tuple comprising preambles associated with respective beam strength ranks of available downlink beams, wherein the first random access channel preamble portion is associated with a first beam strength rank of the respective beam strength ranks, and wherein the second random access channel preamble portion is associated with a second beam strength rank of the respective beam strength ranks, the embodiment method further comprising: detecting, by the radio access node, the second random access channel preamble portion from the second random access channel resource without detecting the first random access channel preamble portion; determining, by the radio access node based on the detecting of the second random access channel preamble portion, that using a second downlink beam of the available downlink beams corresponding to the second random access channel preamble portion results in a second strongest measured signal strength of the available downlink beams at the user equipment; transmitting, by the radio access node to the user equipment, a connection establishment message via the second downlink beam; transmitting, by the radio access node via the second downlink beam, a downlink beam strength report request to the user equipment that requests an indication of a strongest downlink beam of the available downlink beams, the usage of which results in a strongest measured signal strength of the available downlink beams at the user equipment; receiving, by the radio access node in response to the downlink beam strength report request, the indication of the strongest downlink beam of the available downlink beams at the user equipment; and based on the indication of the strongest downlink beam of the available downlink beams assigning, by the radio access node, the strongest downlink beam to be the first downlink beam. Thus, the RAN can determine that the second downlink beam is not the strongest downlink beam available to the UE because the second random access channel preamble portion corresponds to the second rank in the tuple, and thus the RAN requests that the US transmit an indication of the strongest downlink beam available to the UE.

In yet another embodiment of the example method, the random access channel configuration may comprise a random access channel long-sequence preamble indication that indicates a spread-preamble, and wherein the first random access channel preamble portion is a first part of the spread-preamble and the second random access channel preamble portion is a second part of the spread-preamble. The first random access channel preamble portion may be orthogonal to random access channel preambles that are not spread-preambles.

The random access channel configuration may further comprise a group of configured non-spread-preamble first preamble portions, a group of configured spread-preamble first preamble portions, and a group of configured spread-preamble second preamble portions, and the method may further comprise determining, by the radio access node, that the first random access channel preamble portion received via the first random access channel resource corresponds to a spread-preamble, wherein the determining comprises analyzing the first random access channel preamble portion with respect to the group of configured spread-preamble first preamble portions and analyzing the first random access channel preamble portion with respect to the group of configured non-spread-preamble first preamble portions; and decoding, by the radio access node, the second random access channel preamble portion, wherein the decoding comprises analyzing the second random access channel preamble portion with respect to the group of configured spread-preamble second preamble portions without analyzing the second random access channel preamble portion with respect to the group of configured non-spread-preamble first preamble portions.

BRIEF DESCRIPTION OF THE DRAWINGS

FIG. 19B illustrates a continuation block diagram of the example non-transitory machine-readable medium embodiment of FIG. 19A.

DETAILED DESCRIPTION OF THE DRAWINGS

Figure 1:
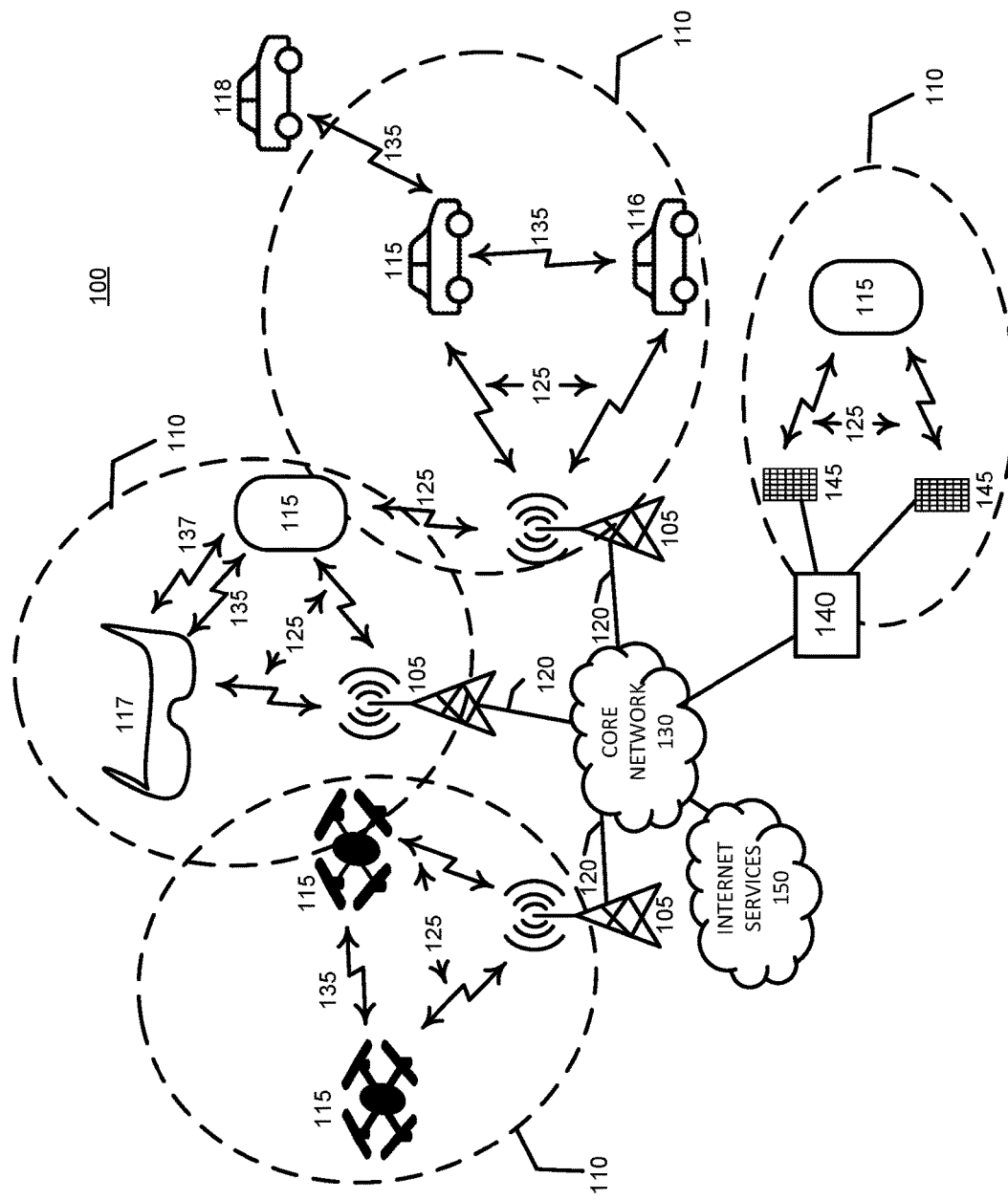
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to FIG. 1, the figure illustrates an example of a wireless communication system 100. The wireless communication system 100 may include one or more base stations 105, one or more user equipment ("UE") devices 115, and core network 130. In some examples, the wireless communication system 100 may comprise a long-range wireless communication network, that comprises, for example, a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI)

may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RB s)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Extension of satisfactory uplink geographic coverage range is important for cellular networks to improve uplink coverage with respect to downlink signal coverage. (The term coverage may be used to refer to signal strength, or signal strength satisfying a level to provide satisfactory wireless communication performance between a UE and a RAN node. Uplink coverage, or performance in the uplink direction from a UE toward a RAN, has traditionally been poorer, or limited, as compared to corresponding downlink coverage due to the significant differences between transmit power of an eNodeB, or gNodeB ("gNB") in 5G NR parlance, and a UE. The result has been poorer uplink performance relative to downlink performance; accordingly, wireless communication uplink performance specification requirements have been relaxed with respect to specification for downlink performance, such as, for example, longer, or more, uplink latency or lower reliability have been deemed acceptable.

However, for 5G deployments, a stringent quality of service is specified for both downlink and uplink directions (even if not the same for both directions), and therefore, uplink performance optimization is desirable.

Several uplink procedures may be severely impacted by lesser uplink coverage, or performance, than downlink performance, which may have significant negative impact on achievable uplink latency and reliability performance. Such procedures negatively impacted may include transmission procedures of an initial radio Resource Control ("RRC") connection establishment for devices transitioning from idle or inactive mode, or state, to a connected mode, or state, uplink control channel transmission of channel state information and HARQ feedback, and uplink data channel transmission of actual uplink payload.

With 5G NR systems, and potentially future generation systems, where stringent qualities of service in both downlink and uplink directions are desired or specified, uplink coverage extension techniques are desirable to bring uplink performance closer to being at the same level or standard as corresponding downlink performance. An early (in a process of a UE connecting to a RAN) uplink procedure for establishing connection to a RAN node is use of a physical random-access channel ("PRACH"). Heretofore, uplink coverage optimization for transmitting of an uplink preamble using defined, or configured, PRACH resource occasions. Accordingly, several techniques for extending and optimizing uplink coverage are disclosed herein that are directed to transmission of a preamble via a physical random-access channel.

Figure 2A:
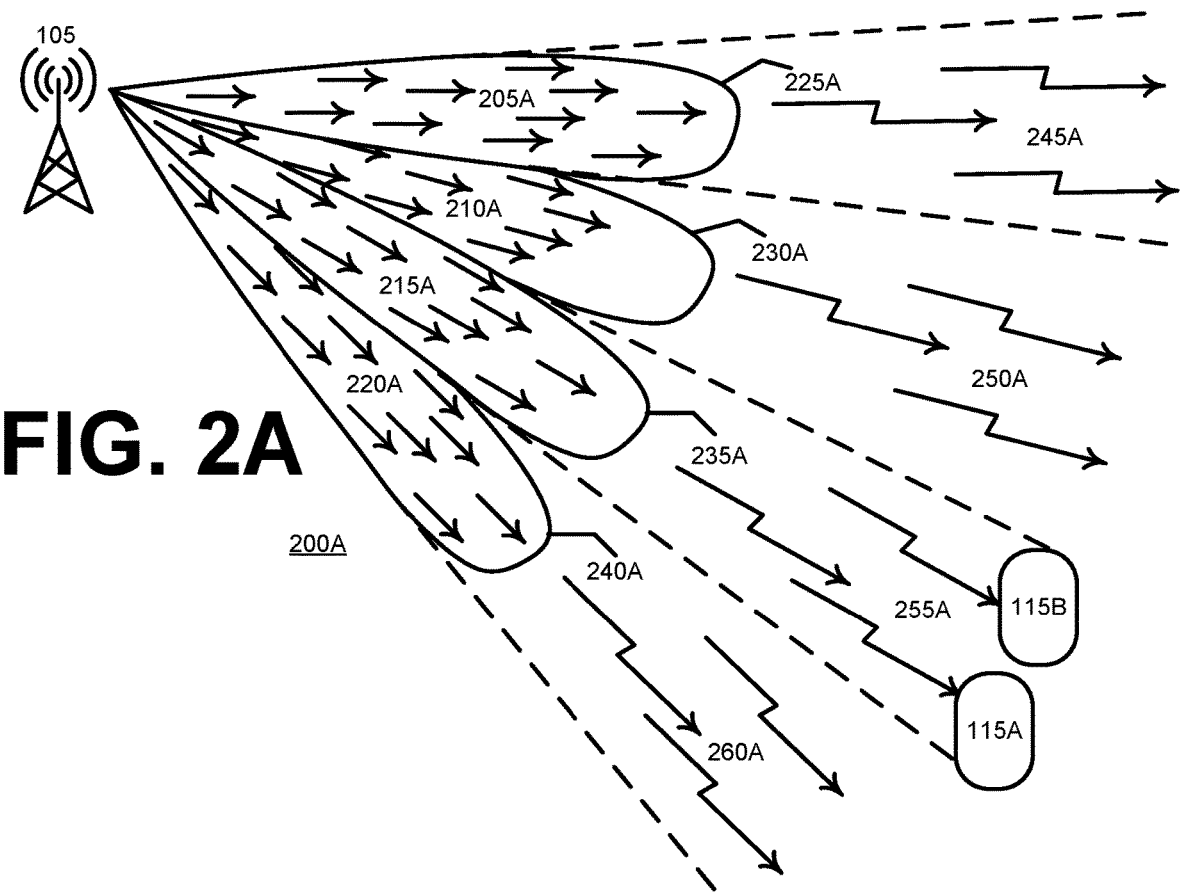
FIG. 2A illustrates downlink beams in an example multi-beam wireless user equipment environment.

Turning now to FIG. 2A, the figure illustrates an example multi-beam wireless user equipment environment 200 with uplink beams that corresponds to respective downlink beams. Environment 200 shows RAN node 105 and UE 115A and UE 115B. UE 115A and UE 115B may be located within a signal coverage of downlink beam 235A, of downlink beams 225A, 230A, 235A, and 240A. Downlink beams 225A, 230A, 235A, and 240A are shown with downlink energy 205A, 210A, 215A, and 220A, which may extend beyond lobes of the downlink beams depicted in unbroken lines. Downlink energy 205A, 210A, 215A, and 220A may extend beyond the main lobes of downlink beams 225A, 230A, 235A, and 240A to downlink energy 245A, 250A, 255A, and 260A as depicted by broken lines that extend downlink coverage of the depicted lobes of downlink beams.

Figure 2B:
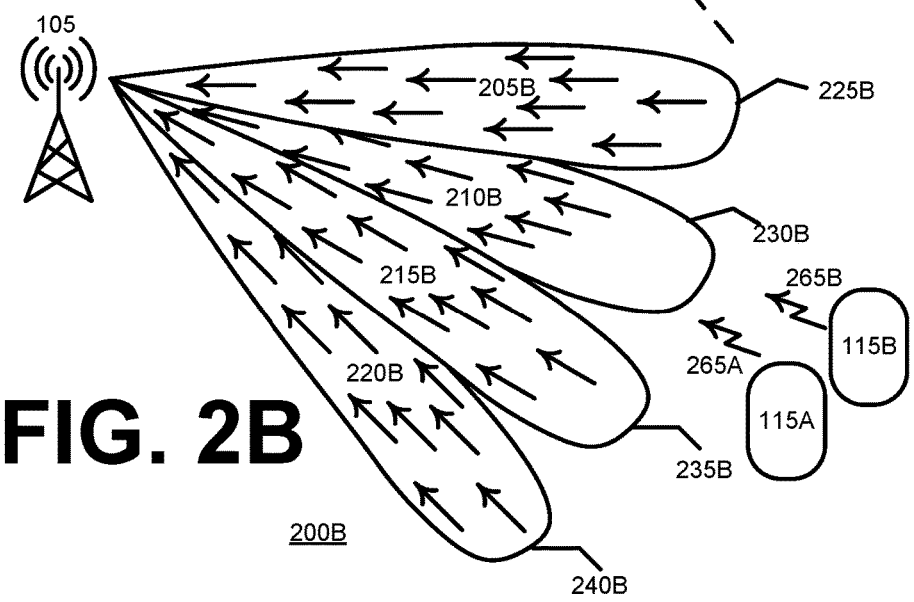
FIG. 2B illustrates uplink beams in an example multi-beam wireless user equipment environment.

Turning now to FIG. 2B, the figure illustrates uplink beams 225B, 230B, 235B, and 240B, which correspond to downlink beams 225A, 230A, 235A, and 240A shown in FIG. 2A. (E.g., if a UE determines that a best, or strongest, downlink beam from RAN 105 is downlink beam 215A, beam 215B will likely be the best uplink beam for the UE to use for uplink transmissions.) A UE 115 may receive one or more synchronization signals, or one or more synchronization signal bursts ("SSB"), and categorize SSBs based on measurement of signal strength parameters (e.g., RSRP, RSRQ, or SINR) corresponding to the SSBs. A UE 115 may determine the signal strength of a detected or received SSB in relation to a configured criterion, for example a coverage criterion or a coverage threshold, in a random access channel configuration. The signal strength may be based on measurement of, for example, RSRP, RSRQ, SINR, etc. and the coverage criterion may correspond to a signal strength measurement. A signal strength, or a signal strength value, may satisfy a configured coverage if the signal strength is equal to or greater than the threshold. The signal strength may not satisfy the threshold if the signal strength is less than the threshold. In FIG. 2A, uplink energy 205B, 210B, 215B, and 220B corresponds to uplink beams 225B, 230B, 235B, and 240B. Uplink energy 205B, 210B, 215B, and 220B shown in FIG. 2B represents sensitivity of RAN 105 to weaker, or less powerful, uplink transmissions from a UE (less powerful relative to downlink transmission from the RAN), for example UE 115A or 115B, that satisfies a coverage criterion, such as, for example, an uplink transmission coverage criteria, which may correspond to a location, range, or distance, of a UE from a RAN at which the RAN has satisfactory sensitivity to an uplink transmission from the UE relative to noise. Because a UE typically does not transmit uplink signals with as much power as a RAN transmits downlink signals, unlike FIG. 2A, which depicts extended downlink energy 245A, 250A, 255A, and 260A corresponding to downlink beams 225A, 230A, 235A, and 240A, FIG. 2B does not depict extended energy corresponding to uplink beams 225B, 230B, 235B, and 240B. Thus, a UE 115 may determine, based on a signal strength of downlink beam 235 shown in FIG. 2A, or based on information contained in a signal received via downlink beam 235A, that the UE is beyond a 'good-coverage' range (e.g., the UE has a poor coverage, or a poor coverage value, that does not satisfy a coverage criterion, such as a threshold) of RAN 105 as shown by UE 115A and UE 115B being beyond the coverage of uplink beam 235B (e.g., coverage depicted by solid lines of the lobe of uplink beam 235B) in FIG. 2B.

Dynamic Physical Random Access Preamble Repetition.

PRACH preamble transmissions can be subject to poor, or low performance, uplink coverage and/or collisions PRACH preamble transmissions from other devices, potentially resulting in delay of UE devices transitioning from idle or inactive mode/state to an active mode/state due to incomplete reception at a RAN of a PRACH preamble or due to the RAN being unable to determine which of multiple UEs transmitted the same PRACH preamble (e.g., a collision). Thus, an embodiment disclosed herein uses multiple uplink resource occasions associated with a downlink beam for a UE to use for random access procedures for transmitting a preamble to a RAN. An idle, or inactive, UE device determines its strongest detected downlink beam (e.g., a downlink beam among multiple available downlink beams having a highest downlink signal strength based on a measurement made by the UE of a downlink signal strength metric). Instead of only transmitting the preamble once in a PRACH occasion, the UE may duplicate the transmission of its selected PRACH preamble via one or more uplink resource occasions associated with the selected downlink beam that was determined by the UE to be the strongest of available (to the IE) downlink beams. Repetition of the PRACH preamble in multiple transmissions allows for a better detectability at the gNB/RAN. Transmitting a preamble multiple times increases detectability of the preamble because the receiving RAN can analyze different parts of each of the transmissions of the same preamble and combine them to arrive at a complete or correct version of the preamble. Not only is detection speed of the preamble increased because the UE and RAN do not have to wait for a next occasion of a single, periodically occurring PRACH occasion to occur, but speed in determining, by the RAN, a collision is also increased since the RAN does not have to wait the period of a single PRACH resource occasion to receive another transmission of the preamble. Thus, coverage for uplink PRACH transmissions is expanded, extended, or otherwise improved.

A RAN node may configure idle and/or inactive UE devices with a minimum coverage threshold. Upon the UE determining that the minimum coverage threshold is not satisfied, the UE may adopt a PRACH preamble repetition procedure. The PRACH configurations can be carried using broadcast system information signaling. Idle/inactive UE devices may calculate, or determine, their received RAN coverage levels, based on reception of 'always-on' synchronization signal blocks ("SSB").

Figure 3:
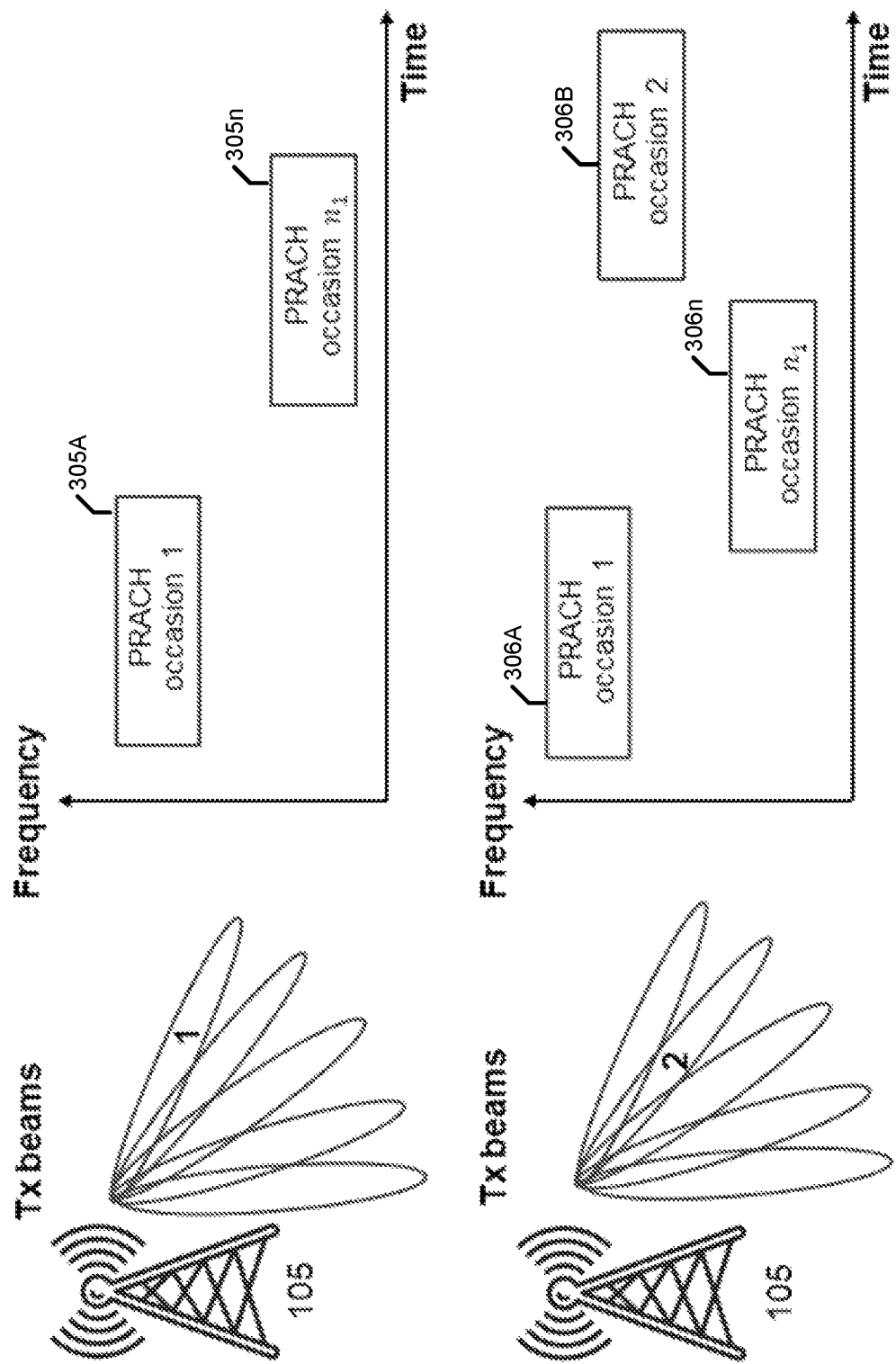
FIG. 3 illustrates an example embodiment of PRACH resources to repeat transmission of a PRACH preamble.

If a first coverage indication fails, or on condition of a first coverage indication failing, to satisfy a coverage criterion (e.g., a downlink beam available to an idle or inactive UE does not contain sufficient signal energy, or signal strength, to meet or exceed a threshold that has been determined or configured as corresponding to a determined uplink signal sensitivity to an uplink signal from the UE by the RAN) a PRACH preamble repetition procedure may be initiated at the UE. The PRACH preamble procedure may comprise transmission of a PRACH preamble, selected by the UE from configured or determined preambles, which may be associated with a downlink beam determined by the UE as a strongest available beam, via multiple, periodically-occurring, resource occasions of an uplink beam, or of uplink resources, as shown in FIG. 3, corresponding to the determined strongest downlink beam. Thus, effective uplink PRACH coverage may be effectively extended because PRACH preamble uplink transmission performance may be improved, albeit at the expense of more consumed battery power of a UE implementing the multiple transmission of the same preamble due to the increased number of transmissions of the same preamble as compared to only transmitting the preamble once per a periodically occurring single uplink resource.

A RAN node can dynamically assign, in a configuration sent to UE devices, a beam-specific number of resource occasions such that overall PRACH performance is optimized. For example, a RAN node may dynamically configure more PRACH repetition occasions for congested beams with more idle or inactive devices 'camping' thereon, and less PRACH repetition resource occasions for lesser congested beams. The term 'camping' may refer to a device, or devices, waiting to connect to a RAN, but not yet connected and the network is not yet aware of the imminent connection of the UE, or UEs. With many closely-located camping devices covered by a given downlink beam of a RAN, many preambles may be transmitted over a small subset of available uplink beams, which may lead to collisions (e.g., more than one UE transmitting the same PRACH preamble to the same RAN); a collision may effectively reduce uplink coverage due to time spent for collision resolution procedures.

A RAN node accordingly may transmit new information elements in a random access channel configuration to idle and/or inactive devices such as the following information elements. One information element of random access channel configuration may comprise a Reference Signal Received Power ("RSRP") coverage minimum threshold for PRACH repetition—an explicit or a quantized coverage level, below which the idle and/or inactive devices adopts PRACH preamble transmissions repetition over the corresponding multiple resource occasions.

Another information element of a random access channel configuration may comprise a format indication of the PRACH repetition, which may comprise an indication for idle/inactive devices to determine a type of supported PRACH repetition per cell. This information object may include two information elements, that may comprises an indication of repetition or an indication of preamble spreading. When the indication implies a PRACH repetition, a configured UE may blindly select conventional PRACH preambles and duplicate their respective transmissions over configured multiple indicated PRACH resource occasions associated with a detected downlink beam that the UE determines to have the highest signal strength that it detects of signal strengths corresponding to multiple downlink beams that are available to the UE. If a configuration includes an indication of a PRACH spread-preamble transmission, a UE may adopt a predefined long PRACH preamble, from specially designed and preconfigured set of long preambles, and spread transmission of the selected long PRACH preamble across configured multiple PRACH resource occasions associated a beam that the UE determines to be a strongest detected downlink beam of downlink beams available for use by the UE.

Yet another Resource information element of a random access channel configuration may comprise occasions per downlink beam. This information element may comprise information of one or more channel resource occasions, pattern indications, or resources (e.g., in terms of timing and frequency domains), which are associated with downlink beams, including periodicity of each of the occasions.

Turning now to FIG. 3, the figure illustrates a diagram of PRACH resources that may be indicated in information elements of a random access channel configuration that may be used by a UE to transmit, in an uplink direction, a physical random access channel preamble. The preamble may be transmitted multiple times by the UE if the UE determines that the UE lies outside a range of good, or satisfactory, coverage (e.g., signal strength corresponding to a strongest detected downlink beam that satisfies a configured threshold) via different resources 305A, 305B, . . . 305n. Repeating transmission of the same PRACH preamble by a UE that is located outside a range that would likely provide satisfactory uplink service may reduce a likelihood of RAN 105 receiving an undecodable, or undecipherable, PRACH preamble from the UE. By transmitting the same preamble in preamble resources 305A through 305n using an uplink beam, or uplink resources, corresponding to downlink beam 1, or for preamble resources 306A, 306B, . . . 306n being transmitted using an uplink beam corresponding to downlink beam 2, even if each transmission is partially corrupted, interrupted, or otherwise distorted, RAN 105 may be able to combine each of the multiple transmission of the same preamble for the respective beams that it receives and determine corresponding uncorrupted preambles from a composite preamble formed from the multiple preamble transmission that it receives. A first transmission of a PRACH preamble via a first configured resource may be referred to as a first random access channel preamble portion and a second transmission of the same PRACH preamble via a second configured resource may be referred to as a second random access channel preamble portion. In other words, the first and second random access channel preamble portions may comprise the same preamble.

Figure 4:
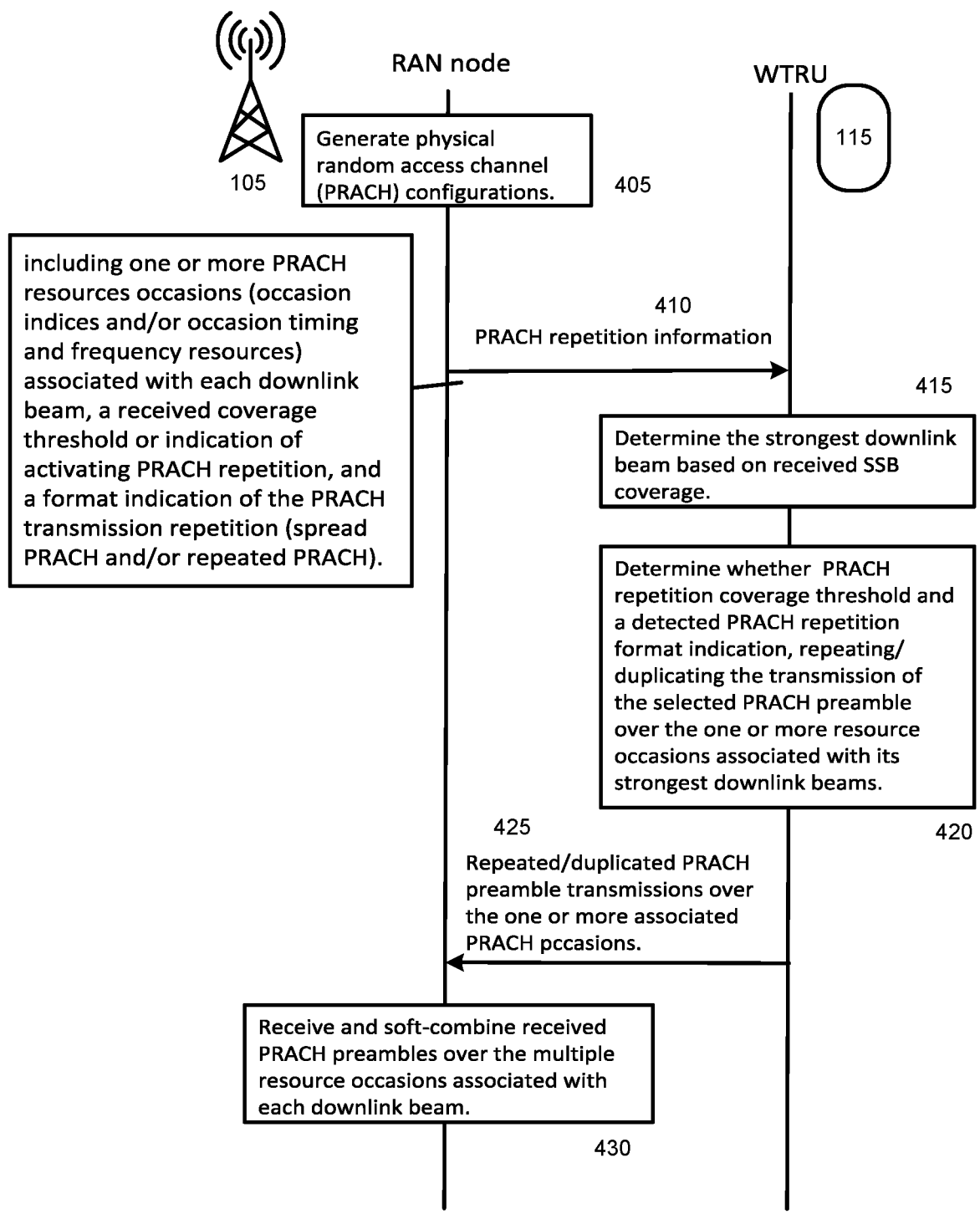
FIG. 4 illustrates a timing diagram of an example embodiment to repeat transmission of a PRACH preamble.

Turning now to FIG. 4, the figure illustrates a timing diagram of an example method 400 to use multiple PRACH resources to transmit a PRACH preamble. At act 405 RAN 105 generates a physical random access channel configuration and transmits the configuration to UE 115 at act 410. The physical random access channel configuration may comprise one or more PRACH resources occasions (occasion indices and/or occasion timing and frequency resources) associated with each downlink beam, coverage threshold (e.g., a signal strength threshold or similar criterion) or an indication of activating of PRACH preamble transmission repetition, and a format indication of the PRACH transmission repetition (spread PRACH and/or repeated PRACH.

The physical random access channel configuration, which may be a random access channel configuration, may comprise one or more PRACH resources occasions, or indications thereof, which indications may comprise an index, or indices, associated with one or more resources, occasion timing information (e.g., a time or times, when an occasion, or occasions, may be available for UE 115 to transmit a PRACH preamble directed to RAN 105) and occasion frequency resources (e.g., a frequency, or frequencies, to being used during the configured occasions). The PRACH resources, or indications thereof in the configuration, may be associated with a downlink beam, a received coverage threshold or an indication of an activating of a PRACH repetition procedure (e.g., transmitting by UE 115 of a preamble in more than one configured occasion), or a format indication of the PRACH transmission repetition type (a spread PRACH preamble as described in reference to FIGS. 7, 8, and 11 herein or a repeated transmission of the same PRACH preamble during different resource occasions). UE 115 receives the transmitted random access channel configuration and determines at act 415 a strongest downlink beam based on received SSB coverage information corresponding to multiple downlink beams that may be available to the UE from RAN 105. At act 420 UE 115 determines whether a signal strength measurement of a strongest downlink beam (e.g., a downlink beam from among multiple downlink beams available to the UE that has a stronger signal, or a higher signal strength value, than the other downlink beams) satisfies a configured threshold (e.g., signal strength of the strongest beam meets or exceeds the signal strength threshold). On condition of determining that a signal strength of the strongest downlink beam available to UE 115 is less than the configured threshold, for example, the UE determines a PRACH preamble repetition format indication from the random access channel configuration and at act 425 transmits a selected preamble via resource occasions associated with its strongest downlink beam. The random access channel configuration may comprise the association of the preamble resource occasions with downlink beams, including the strongest downlink beam. At act 430 RAN 105 may receive preambles transmitted at act 425 and 'soft-combines' the PRACH preambles received via the multiple resource occasions associated with the strongest downlink beam as determined by UE 115.

Figure 9:
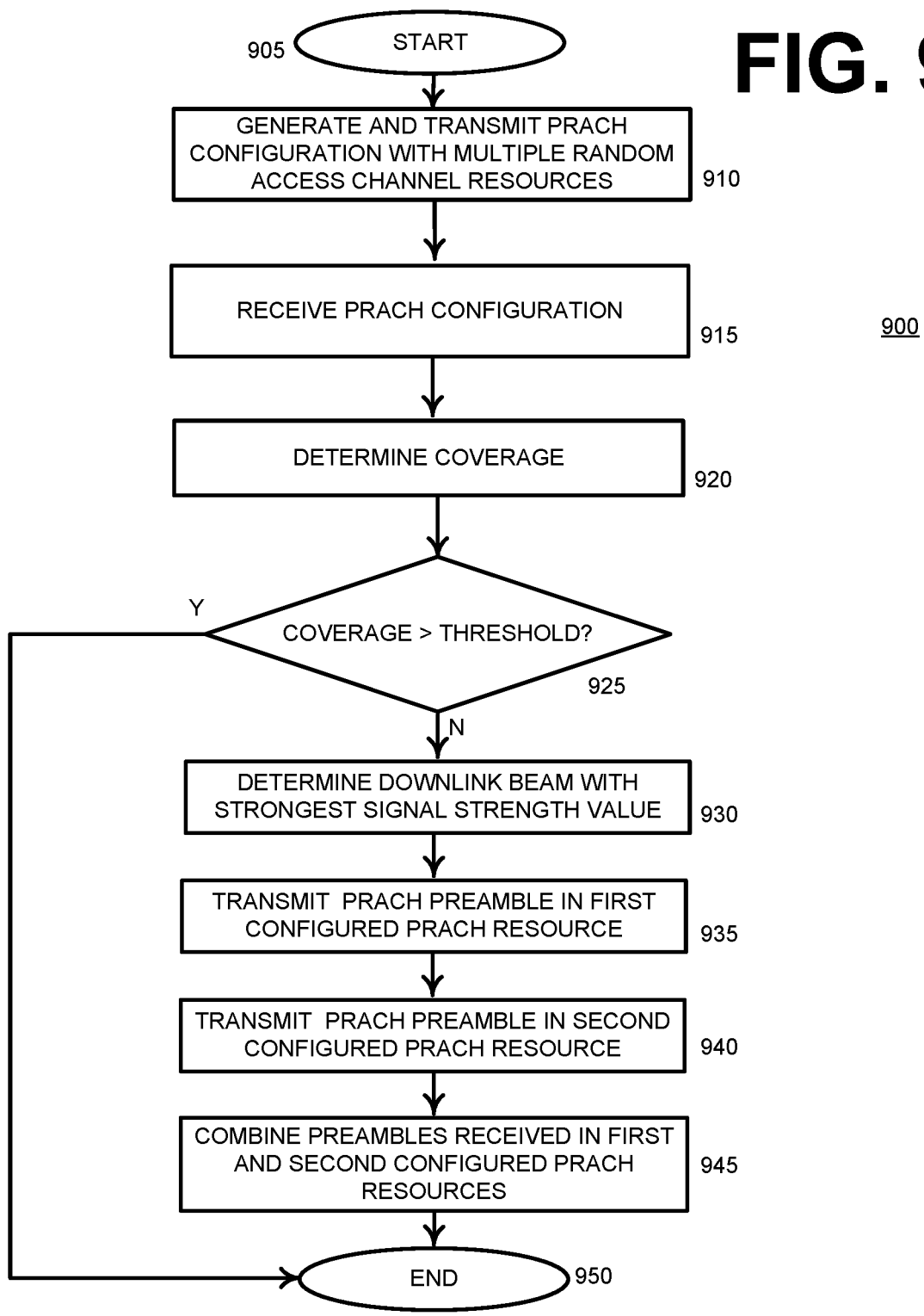
FIG. 9 illustrates a flow diagram of an example method to use repeated transmissions of a PRACH preamble.

Turning now to FIG. 9, the figure illustrates a flow diagram of an example method 900 to use multiple PRACH resources to transmit a PRACH preamble in a strongest uplink beam, or using uplink resources corresponding a strongest downlink beam, as determined by a UE needing to transmit a PRACH preamble based on a signal strengths of available downlink beams available to the UE. Method 900 begins at act 905. At act 910 a RAN generates and transmits to a user equipment a physical random access channel configuration that may include indications of multiple random access channel resources. At act 915 the user equipment receives the random access channel configuration. At act 920 the user equipment may determine a coverage, or a coverage value, based a measured signal strength value, for one or more downlink beams corresponding to the RAN. At act 925 the user equipment determines whether the coverage that was determined at act 920 satisfies a criterion, or criteria, for example a threshold. The criterion may be included in the configuration received at act 915. The criterion, or threshold, may comprise a value below which a determined coverage, or a determined signal strength value, of a downlink beam corresponding to the RAN does not correspond to an acceptable level of wireless communication performance between the user equipment and the RAN via the downlink beam to which the signal strength value corresponds. If a determination is made at act 925 that the determined coverage meets or exceeds the threshold, method 900 advances to act 950 and ends.

If, however, a determination is made at act 925 that the coverage determined at act 920 does not meet or exceed, or otherwise satisfy a coverage criterion, or criteria, method 900 advances to act 930. At act 930 the user equipment determines a downlink beam from multiple downlink beams that may be available for use by the user equipment and for communicating with the RAN as being a strongest of the downlink beams. The determination made at act 930 may use values determined at act 920 when the user equipment may have been determining whether at least one downlink beam available for use by the user equipment exceeded or otherwise satisfied the threshold at act 925.

After determining a strongest downlink beam based on a signal strength value corresponding to the downlink beam, the user equipment transmits at act 935 a first physical random access channel preamble, or preamble portion, via a first configured physical random access channel resource. The physical random access channel preamble portion transmitted at act 935 may be one of multiple preambles included in a configuration, such as the configuration received at act 915. The configured physical random access channel resource used at 935 may be a resource indicated in the configuration received at act 915. The configured physical random access channel resource used at act 935 may comprise a first occasion, a first frequency, or a first other type of resource.

At act 940 the same physical random access channel preamble transmitted at act 935 may be transmitted again in a second configured physical random access channel resource. The retransmitted same preamble portion may be referred to a second preamble portion. The physical random access channel preamble portion transmitted at act 940 may be one of multiple preambles included in a configuration, such as the configuration received at act 915. The configured physical random access channel resource used at 940 may be a resource indicated in the configuration received at act 915. The configured physical random access channel resource used at act 940 may comprise a second occasion, a second frequency, or a second other type of resource. The first preamble portion and the second preamble portion may be the same preamble portion or the same preamble.

At act 945 the RAN combines the first preamble portion transmitted at act 935 and second preamble portion transmitted at act 940 to result in a composite, combined, or complete, version of the preamble portion that was transmitted at act 935 and at act 940, either of which portions may not have been fully delivered to the RAN due to the coverage determined at act 920 being poor enough that the coverage did not satisfy the criterion at act 925. Thus, even though the user equipment had a coverage that was less than the threshold used at act 925, transmitting the same preamble potion multiple times increases the likelihood of the preamble, or preamble portion, arriving at the RAN, perhaps only a part of the preamble, if not the entire preamble portion, as a result of the transmission at act 935 and perhaps a different part of the preamble portion, if not the entire preamble portion, as a result of the transmission at act 940, without having to wait a periodicity associated with the uplink PRACH resources configured in the configuration received at 915 to transmit the preamble, or preamble portion again. Method 900 advances to act 950 and ends.

Transmission and Configuration of Tuples of Multiple PRACH Preambles.

PRACH preamble collisions most likely occur in uplink transmissions that correspond to downlink beams that serve a large number of UE devices simultaneously, such as may be the case when UE devices are closely located geographically. In such a scenario, closely located UE devices may select the same PRACH preamble (from among preambles with which the UE devices have been configured) for transmission, which increases PRACH preamble collision probability. Repeating, or duplicating, transmission of a PRACH preamble on multiple resource occasions associated with a strongest beam, as described above in reference to FIG. 3, and FIG. 4, by multiple UE devices that have chosen the same preamble, on a congested beam may result in PRACH preamble collisions.

To alleviate PRACH preamble collisions, including for uplink transmission corresponding to a congested downlink beam, a set of PRACH preamble tuples may be configured in a random access channel configuration sent from a RAN to a UE, where each PRACH tuple includes one or more distinctive PRACH preambles that are respectively associated with a ranking of available downlink beams as determined by the UE. Furthermore, different tuple sets may be associated with a different coverage criterion, or criteria. Thus, devices for which a first coverage indication fails to satisfy a coverage criterion, or criteria, may transmit each PRACH preamble from a PRACH tuple, which tuple may be determined based on analysis of signal strength, or coverage, of one or more downlink beams with respect to the coverage criterion, or criteria, over resource occasions respectively associated with a ranking of beams, which ranking may be determined by the UE. Thus, several PRACH preambles may be transmitted over different beams, or resources corresponding thereto, such that a probability of PRACH preamble collision is reduced, in case one or more of the downlink beams are congested.

The RAN/gNB to which the multiple preambles are transmitted accordingly detects the transmitted PRACH preambles of the various configured tuples. In case of detecting a PRACH preamble that corresponds to a first ordered, or first ranked (e.g., corresponding to a downlink beam having a strongest signal, or highest rank, as determined by the UE that transmitted the preamble) within configured tuples, the RAN may transmit RRC connection establishment signaling using the same downlink beam that corresponds to the received PRACH preamble, since that beam should be the strongest detected beam as determined by the UE that transmitted the preamble. However, in case the gNB detects a PRACH preamble that corresponds to a beam ranking that is not a first ordered (e.g., rank 1) within any of the configured tuple, the gNB transmits a strongest beam reporting request alongside the RRC connection establishment signaling to the UE that transmitted the preamble via resources corresponding to the non-highest ranked beam, since the preamble and resources would have been transmitted by the UE in the beam being evaluated by the RAN as not being the best beam, or beam having the strongest signal strength, as detected and determined by the UE.

In certain cellular deployments, where there is a large device population (e.g., a dense urban area), PRACH performance per each downlink beam can significantly vary depending on the number of camping devices. For example, for high device capacity beams, more than on device may randomly select the same PRACH preamble from configured preambles for initial network access, thus leading to PRACH collisions, which further reduces the uplink coverage and respective performance. Therefore, it is beneficial for low-coverage (e.g., as determined by a UE based on signal strength measurements) and/or uplink critical devices to diversify PRACH preamble transmission over resources associated with multiple downlink beams that may be reasonably detected by a UE (e.g., reasonably detected meaning that even if a signal strength of a downlink beam does not satisfy a coverage criterion, the beam may still be satisfactorily used for communication between the UE and the RAN). Thus, when there is a collision of a PRACH preamble over one or more of the resource occasions, another PRACH preamble transmission over another beam may be still detected at the gNB with a lower likelihood of another collision due to a likelihood being low that two (or more) different UE devices would select the same first preamble to send via resources corresponding to their respective first ranked beams and also both select a second preamble to send via resources corresponding to their respective second ranked beams (and so forth if a random access channel configuration includes tuples that comprise more than two preambles corresponding to more than two different beam rankings).

Figure 5:
FIG. 5 illustrates a table of example configurations of different PRACH preambles corresponding to different wireless signal strength coverages.

Turning now to FIG. 5, the figure illustrates configuration information 500 of an example configuration that may facilitate using multiple PRACH resources to transmit different PRACH preambles via corresponding different uplink beams based on a ranking of the uplink beams relative to signal strength of the beams as determined by a UE, needing to transmit a PRACHJ preamble, wherein the ranking is based on signal strengths of downlink beams corresponding to the uplink beams.

In an example, since UE devices sending PRACH preambles are not yet connected to the gNB/RAN when transmitting their respective PRACH preambles, the gNB is not aware of the best or strongest detected downlink beam of each UE device. Thus, using a configuration of PRACH preamble tuples, where each tuple consists of multiple PRACH preambles, ordered to be transmitted on the strongest downlink beam, the next strongest beam, the next strongest beam, and so forth can result in reduced preamble collisions at the RAN. Accordingly, a RAN node preconfigures devices with a list, or a codebook, of multiple PRACH preamble tuples, as shown by the example depicted in FIG. 5. For instance, a tuple of two PRACH preambles 515 in row A of configuration 500 indicates that a UE device that has available a beam having a determined coverage/signal strength satisfying $x_1$ in column 505 should transmit a first PRACH preamble portion (PRACH_preamble_1 shown in FIG. 5) via a resource occasion associated with a beam the UE determines as its strongest beam (e.g., highest ranked beam), and the UE should transmit a second PRACH preamble portion (shown as PRACH_preamble_2) over a configured resource occasion associated with a second strongest beam, also as determined and ranked by the UE. (It will be appreciated that in an embodiment, use of the example configured tuples shown in FIG. 5 may only be used if a strongest beam available to a UE does not satisfy another criterion, such as a minimum coverage criterion, or threshold.) As shown in FIG. 5, coverage measurements of a strongest beam may be analyzed with respect to different criteria as shown in column 505 rows B and n of example configuration 500. For example, if a UE determines that a coverage of its strongest downlink beam is between criteria $x_1$ and $x_2$ (after the coverage has already been determined to not meet or exceed a configured minimum coverage criterion) the UE may transmit first preamble portion PRACH-_preamble_1, second PRACH preamble portion PRACH-_preamble_2, and third PRACH preamble portion PRACH_preamble_3 via uplink PRACH resources associated with downlink beams i, j, and k, respectively.

Thus, by configuring UE devices with a random access channel configuration that comprises tuples as shown in FIG. 5 a RAN node may be able to determine a strongest beam serving a UE by determining that a PRACH preamble received from a device, over a resource occasion that is exclusively associated with a highest downlink beam strength, and thus a highest ranking, as determined by the UE. Using the configured tuples as described above may provide a performance improvement over transmitting by a UE a single preamble via multiple PRACH uplink resources as described above in reference to FIG. 3 and FIG. 4 because of a reduced likelihood of collisions of the same preamble from different UE devices, and thus a reduced need for collision resolution procedures conducted between the RAN and UE, but at the expense of more processing at the UE in determining a ranking of available beams according to measured signal strength and in determining different preambles to transmit in multiple configured uplink PRACH resources.

Therefore, at the RAN node, when detecting a first PRACH preamble portion (e.g., corresponding to the strongest, and highest ranked, beam as determined by the UE that transmitted the first PRACH preamble portion) of any of the defined PRACH preamble tuples, the RAN may transmit RRC connection establishment signaling over the same beam corresponding to configured PRACH resources via which the first PRACH preamble portion was transmitted. However, in case of detecting by a RAN a PRACH preamble of a predefined PRACH tuple corresponding to a non-first-ranked beam, the RAN node may transmit via a downlink beam a reporting indication to UE device(s) of interest, instructing the UE devices to further report their respective strongest downlink beams. First, second, and third PRACH preamble portions may comprise different respective PRACH preambles when transmitting PRACH preambles according to configuration information such as configuration information 500.

Figure 6:
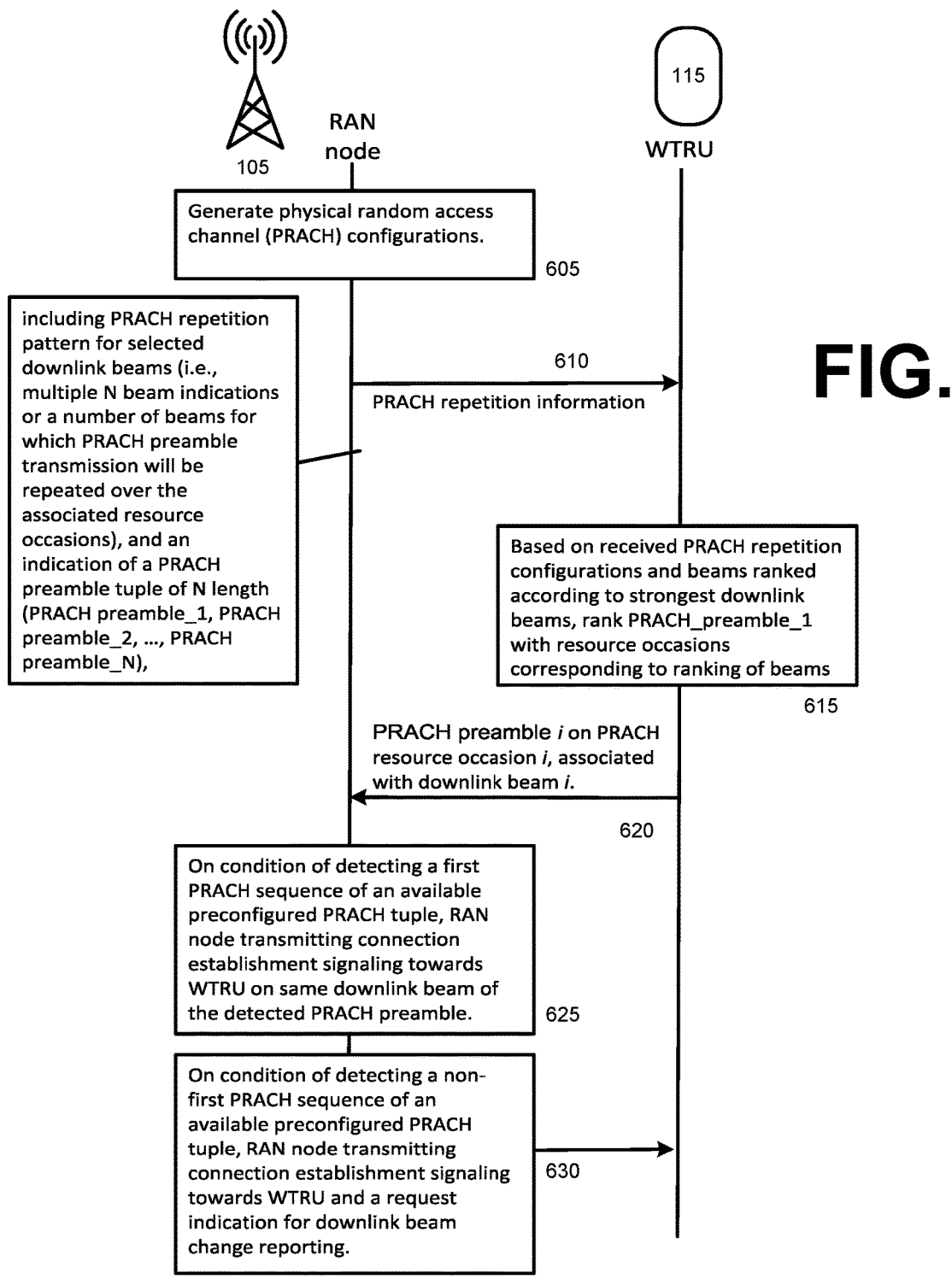
FIG. 6 illustrates a timing diagram of an example embodiment to use different PRACH preambles corresponding to different wireless signal strength coverages.

Turning now to FIG. 6, the figure illustrates a timing diagram of an example method 600 to use multiple PRACH resources to transmit different PRACH preambles in different uplink beams based on ranking of the uplink beams, which rankings are based on signal strength of downlink beams corresponding to the uplink beams. At act 605 RAN 105 generates a physical random access channel configuration, which may be a random access channel configuration and transmits the random access channel configuration to UE 115 at act 610. UE 115 receives the random access channel configuration at act 615. The random access channel configuration may comprise PRACH repetition patterns (which may correspond to indices to correspond to a ranking of beams by the UE based on signal strength values). The configuration may also comprise PRACH preambles, or preamble portions, that respectively correspond to the indices. For example, the configuration may comprise an index value of 1 (or 'i' as shown in FIG. 5) and a first preamble, or first preamble portion, that corresponds to index 1, and the configuration may comprise an index 2 (or 'j' as shown in FIG. 5) and a second preamble, or second preamble portion, that corresponds to index 2. At act 515, UE 115 ranks downlink beams that it can detect based on respective measured signal strength values, and associates the strongest beam with index 1 and thus with a first preamble, or first preamble portion; associates the next strongest beam (e.g., the second strongest beam) with index 2 and thus with a second preamble, or second preamble portion, and so on for other beams the UE may be able to detect. The configuration may comprise the preambles, or preamble portions, as tuples (e.g., first preamble 515 in column 515 row A in FIG. 5 being associated with beam index 1, or i (column 510 row A), being associated with beam index 2. Thus, a particular downlink beam is not associated in the configuration with a particular preamble 515 in FIG. 5—instead a preamble is associated with a beam index. If RAN 105 receives a transmission of preamble 1 via a particular uplink beam, or resource, corresponding to a downlink beam, from UE 115, the RAN can determine that the particular downlink beam is the strongest beam available to the UE because the UE transmitted the preamble associated in the configuration with beam index 1 via resources associated with the particular beam. If RAN 105 does not receive a preamble associated with beam index 1, but receives a second preamble associated with beam index 2, then the RAN may determine that the preamble was not received via resources associated with the strongest beam of the UE and thus, instead of, or in addition to, initiating an RRC connection procedure with the UE, may transmit a request for the UE to report its strongest beam to the RAN so that the RAN can initiate an RRC connection procedure with the UE via the strongest beam of the UE instead of via the beam in which the preamble associated with a beam index other than 1 was transmitted by the UE. This scenario may arise if there is a collision of the same preamble (e.g., more than one UE sends the preamble that is associated in the configuration at UE 115 with beam index 1). It will be appreciated that in an embodiment, a given preamble of a tuple may be transmitted multiple times via multiple resources associated with a beam corresponding to the beam index associated with the preamble in the configuration. In other words, acts described in reference to FIGS. 3, 4 and 9 may be combined with the acts described in reference to FIGS. 5, 6, and 10, but it will be appreciated that such combining is not necessary. Thus, at act 620, based on received PRACH repetition configurations and determined beams ranked according to their respective signal strengths, UE 115 transmits PRACH_preamble_1 (as shown in FIG. 5) on resource occasions associated with strongest downlink beam 1, and remaining PRACH preambles N over respective resources or respective beams ranked according to signal strength.

At act 625 RAN 105 receives PRACH transmissions from one or more UEs, including UE 115, according to configured PRACH tuples. On condition of detecting a first PRACH sequence of an available preconfigured PRACH tuple, (e.g., a preamble associated with beam ranking index of 1, or i as shown in FIG. 5) RAN node 105 may transmit at act 630 connection establishment signaling towards UE 115 on the same downlink beam of the detected PRACH preamble. On condition of detecting a non-first PRACH sequence of an available preconfigured PRACH tuple, RAN node 105 may transmit at act 630 connection establishment signaling towards WTRU and a request indication requesting downlink beam change reporting.

Figure 10:
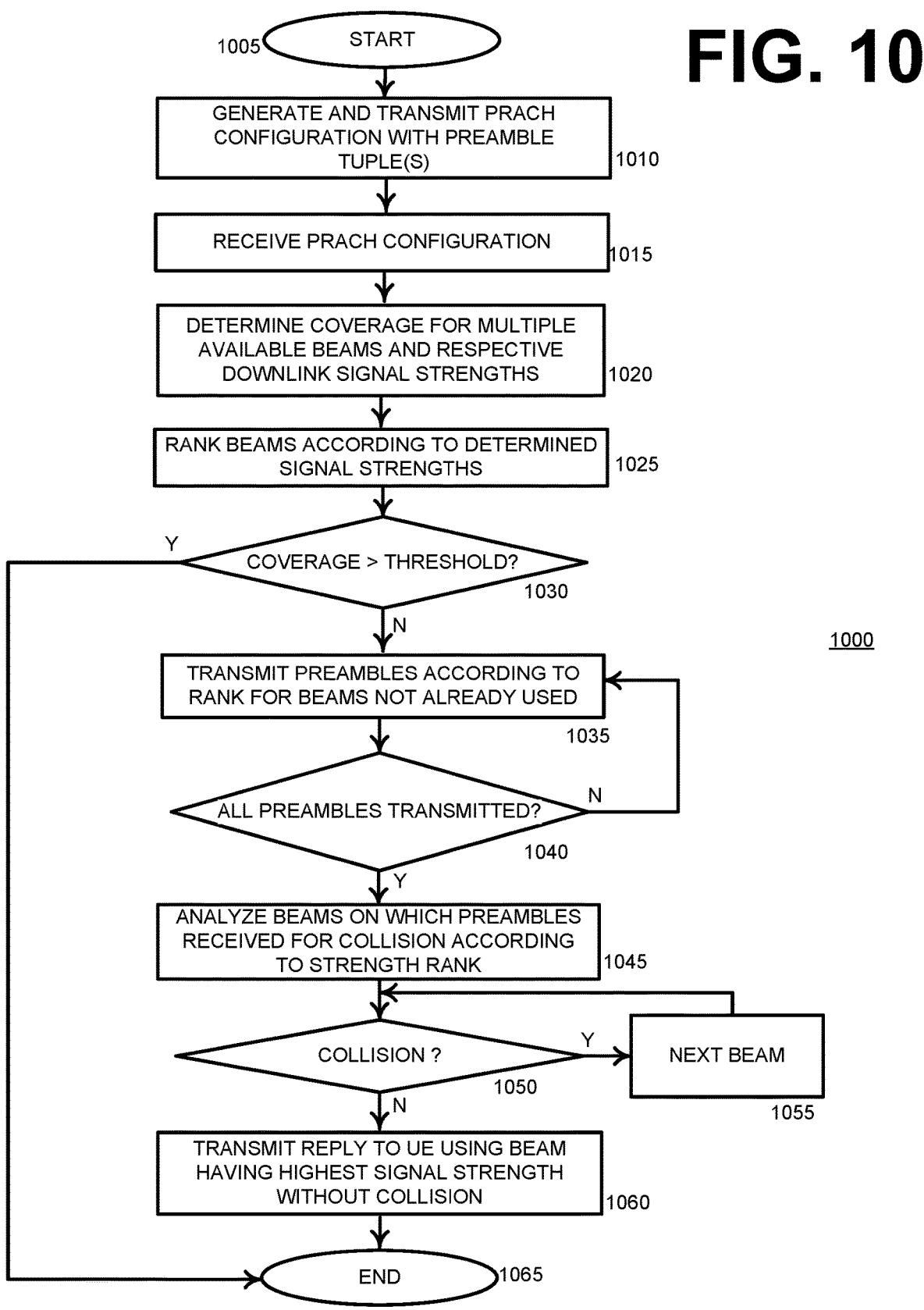
FIG. 10 illustrates a flow diagram of an example method to use different PRACH preambles corresponding to different wireless signal strength coverages.

Turning now to FIG. 10, the figure illustrates a flow diagram of an example method 1000 to use multiple PRACH resources to transmit different PRACH preambles in different uplink beams based on ranking of the uplink beams based on signal strength of the uplink beams. At act 1010 a RAN generates and transmits to a user equipment a physical random access channel configuration that may comprise one or more tuples that associate different random access channel preambles, or different preamble portions, with respective ranking index values and corresponding respective signal strength criteria. At act 1015 the user equipment receives the random access channel configuration. At act 1120 the user equipment may determine a coverage or coverages, or a coverage value or values, based on measured signal strength values, for one or more downlink beams corresponding to the RAN. At act 1025 the user equipment determines a ranking of available downlink beams based on respective signal strength value measurements of downlink beams available to the user equipment. The user equipment may associate the determined rankings with beam index values in the configuration received at act 1015. At act 1030 the user equipment determines whether the coverage of one of the available downlink beams satisfies a coverage criterion, such as a threshold. If so, method 1000 advances to act 1055 and ends.

If, however, a determination is made at act 1030 that a downlink beam ranked at act 1025 as having a highest rank of the beams (e.g., a downlink beam available to the user equipment having a higher determined signal strength value than signal strength values of other available downlink beams) does not satisfy the coverage criterion, method 1000 advances to act 1035. The coverage criterion may be included in the configuration received at act 1015. The criterion, or threshold, may comprise a value below which a determined coverage, or a determined signal strength value, of a downlink beam corresponding to the RAN does not correspond to an acceptable level of wireless communication performance between the user equipment and the RAN via the downlink beam to which the signal strength value corresponds.

At act 1035 the user equipment transmits preambles via resources corresponding to downlink beams according to the ranking determined at act 1025. As described elsewhere herein, FIG. 5 illustrates configuration information 500 that depicts preambles in tuple 515 associated with beam ranking indices tuple 510. Thus, based on a strongest beam having a coverage satisfying a given criteria (e.g., different criteria corresponding to different rows in configuration information 500 shown in FIG. 5) preambles from the tuple corresponding to a criteria row shown in FIG. 5, for example, are transmitted at act 1040 by the user equipment via beam resources, corresponding to beam rankings that are associated with the preambles, as shown, for example in FIG. 5. It will be appreciated that at act 1040 shown in FIG. 10, a first preamble, or a first preamble portion, associated with a highest, or strongest, ranked beam may be transmitted via resources corresponding to the determined strongest beam, before a second preamble, or second preamble portion, associated with next strongest ranked beam index is transmitted via resources corresponding to the second strongest beam, which may be transmitted before a third preamble, or third preamble portion is transmitted via resources corresponding to the third strongest beam, and so on. When a determination is made at the user equipment that preambles of the preamble tuple 515 shown in FIG. 5 have been transmitted, method 1000 advances to act 1045. It will be appreciated that uplink resources corresponding to a given downlink to use for transmitting the preambles of tuple 515 shown in FIG. 5 may be part of the configuration received at act 1015 or may be part of a different configuration received from the RAN.

Continuing with description of FIG. 10, after the RAN has received the preambles, or preamble portions, transmitted at iterations of act 1035, the RAN analyzes the preambles to determine signal beam ranking as determined by the user equipment. If the RAN receives a first preamble that it associated a beam ranking index of 1 with in the configuration that it transmitted at act 1010, the RAN determines, or 'knows,' that the beam corresponding to the resources via which that the first preamble, or first preamble portion, was receive is the downlink beam that the user equipment determined as the strongest downlink beam available to the user equipment and the RAN determines at act 1050 that a collision did not occur between the first preamble portion and the same preamble portion transmitted by another user equipment. Method 900 advances to act 1060 and the RAN transmits a reply to the user equipment that transmitted the first preamble portion, which replay may comprise RRC signaling information to establish a session connection between the user equipment and the RAN before advancing to act 1065 and ending.

If the RAN does not detect at act 1045 a first preamble that was associated in the configuration transmitted at act 1010 with the highest beam rank index, but receives a second, third, . . . n preamble in resources corresponding to one or more downlink beams, then the RAN may determine at act 1050 that a collision between the first preamble, or first preamble portion, occurred with the same preamble transmitted by another user equipment. The RAN may advance to act 1055 and continue to monitor for other preambles, or preamble portions, from the user equipment until it decodes, or otherwise determines, a preamble from the preamble tuple from the configuration that was transmitted at act 1010. If the RAN determines that it has received from the user equipment a preamble from the tuple in the configuration that was transmitted at act 10101, but that the received preamble is not the preamble associated in the configuration with the highest beam rank index, the RAN may transmit at act 1060 a reply to the user equipment that includes RRC signaling as well as a request to report its determined strongest downlink beam so that even though the RRC signaling transmitted at act 1060 may be used to establish a connection with user equipment the RAN can send further signaling to the user equipment to later establish a connection via the strongest downlink beam available to the user equipment. Method 1010 advances to act 1065 and ends.

Dynamic PRACH Preamble Spreading.

PRACH preamble repetition technique configurations as disclosed above may use multiple available resource occasions or a large number of orthogonal PRACH preambles, either of which may not always be fulfilled in certain cellular deployment scenarios or situations, for example where multiple UE devices are in an area served by a RAN and the UEs have similar coverage determinations (e.g., satisfying criteria 505 shown in FIG. 5 such that the UEs attempt to use the same tuple 515 correspond to the same row of the configuration table information 500) and similar ranking of downlink beams such that the UEs attempt to send the same PRACH preambles via the same uplink beam resources. Such a scenario could result in PRACH preamble collisions, which, as discussed above, may lead to increased latency and concomitant degraded performance in establishing a connected session between a UE and a RAN.

A PRACH preamble spreading technique embodiment uses a configured listing, or codebook, of long PRACH spread-preambles for use by devices that have a determined low uplink coverage (e.g., determined by a UE, as described elsewhere herein, by analyzing measured downlink beam signal strength values or parameters and determining that the determined coverage does not satisfy a criterion, or criteria, such as a minimum signal strength threshold which if satisfied may not typically result in the UE using example embodiment techniques disclosed herein). A UE device that is determined to have a low coverage may spread transmission of a selected (e.g., selected by the UE from multiple preambles configured in the UE) long preamble over multiple resource occasions for a determined strongest downlink beam. Accordingly, a RAN/gNB can collect more energy over longer duration of transmission of a PRACH preamble, thus expanding, or extending, effective uplink coverage for transmitting PRACH preambles. To optimize resource utilization for initial access (e.g., establishing RRC connection between a UE and RAN), a long PRACH spread-preamble may be designed such that the spread-preamble, or a first portion of a spread-preamble, can coexist with high coverage devices (e.g., devices having a determined signal strength for a strongest available downlink beam that satisfies a minimum signal strength threshold) on some resource occasions, which resource occasions may be shared among both low-coverage and high-coverage devices (e.g., devices that determine a strongest downlink beam of available downlink beams that does not satisfy a minimum signal strength threshold and devices that determine a strongest downlink beam of available downlink beams that satisfies a minimum signal strength threshold, respectively).

In a PRACH preamble spreading technique embodiment, transmission of PRACH preambles, or preamble portions, may be spread over longer transmission durations than may be used for transmission of a convention PRACH preamble. This allows the RAN node more time to 'harvest', or detect, energy of the transmitted PRACH preambles, therefore, expanding, or extending, the effective uplink coverage for PRACH transmissions. This may be useful when there are not many available PRACH preamble and/or PRACH resource occasions due to high device density (e.g., a large number of devices being served by a given downlink beam from a RAN). Thus, the RAN node may configure low coverage devices (e.g., devices with measured signal strength of a strongest downlink beam not satisfying a signal strength threshold) with a specially designed long PRACH format, where preambles generated according to the long PRACH format are to be transmitted and spread over multiple resource occasions. Some of those resource occasions can be shared between devices of low and high coverage in order to maximize the PRACH channel capacity. Therefore, the long PRACH spread-preambles may be designed such that they consist of two parts, or portions. The first long PRACH sequence portion may be designed to be orthogonal to other PRACH preambles, including conventional non-spread preambles, that may be generated according to conventional non-spread-preamble PRACH formats, while the second preamble sequence part/portion may not necessarily be generated to preserve orthogonality to conventional PRACH preambles. Not preserving orthogonality for the second portion of a spread preamble may increase a number of available preamble possibilities, thus facilitating increased configured PRACH preambles which may reduce a likelihood of collisions of the same preamble being transmitted in the same uplink resources by different UE devices.

Figure 7:
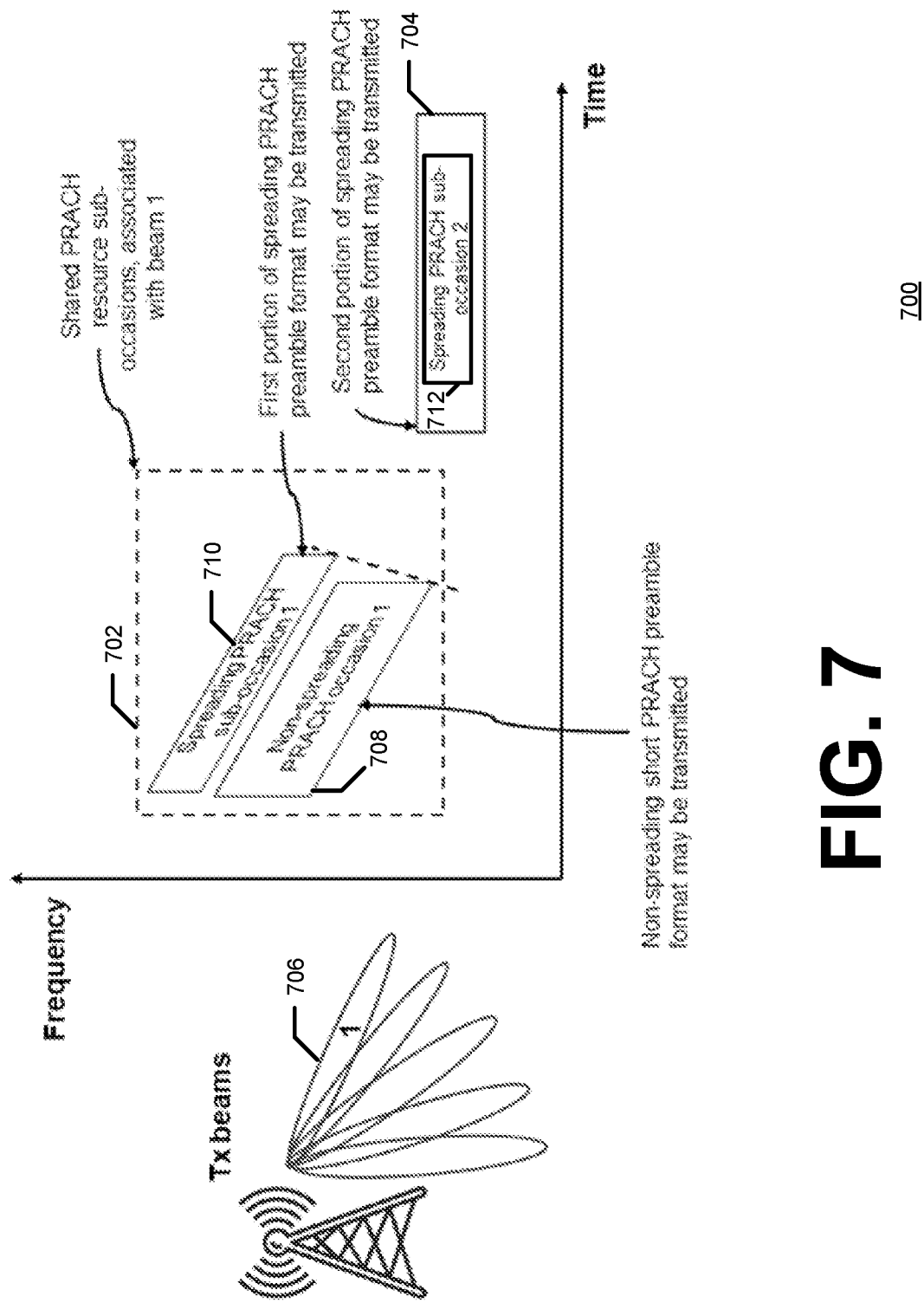
FIG. 7 illustrates a diagram of example PRACH resources to use spread PRACH preambles.

Turning now to FIG. 7, the figure illustrates a diagram of configured first uplink resource occasion(s) 702 (could be one or more occasion, or occasions, at respective, and different frequencies but at the same time) and configured second uplink resource(s) 704 associated with a first downlink beam 706 shown in the figure being use to transmit a long PREACH spread-preamble comprising a first preamble portion 710 and a second preamble portion 712. First resource occasion 702 may be used to transmit non-spread PRACH preambles. If first spread-preamble portion 710 is orthogonal to non-spread-preambles, non-spread preamble 708 can coexist with first spread-preamble portion 710 such that first resource 702 may be used for uplink transmission of PRACH preambles that are non-spread as well as for spread-preambles. Occasions of resources 702 and 704 may be referred to as sub-occasions. Over a shared-resource sub-occasion, a first portion of the long PRACH spread-preambles being orthogonal to conventional non-spread PRACH preambles facilitates coexistence of PRACH preambles, while second portions, such as second portion 712 and possibly subsequent third, fourth, . . . n portions, may not necessarily be orthogonal over non-shared resource sub-occasions, such as resources 704 (shared meaning that resource occasions 702 may be used for spread-preambles as disclosed herein as well as convention non-spread PRACH preambles). Therefore, a UE device not satisfying a low coverage threshold (thus being determined to be a low coverage deice as described elsewhere herein), may select a long PRACH spread-preamble from spread-preambles configured by a RAN in a random access channel configuration and may spread transmission of the selected PRACH spread-preamble over multiple sub-occasions that are associated with the UE's determined strongest downlink beam.

The RAN node may apply a process, such as decorrelation, to a received PRACH preamble that may have been selected by a transmitting UE from among many configured preamble possibilities over a sub occasion of a shared PRACH resource, such as resource 702. For example, a RAN/gNB may attempt decorrelating preamble portions received via occasions of shared resource 702 with respect to all possible spread and non-spread PRACH preambles to identify which preambles are being transmitted. Over sub-occasions of non-shared spreading resource 704 the RAN node may only apply decorrelation with respect to possible PRACH spread-preamble formats configured in a random access channel configuration.

Figure 8:
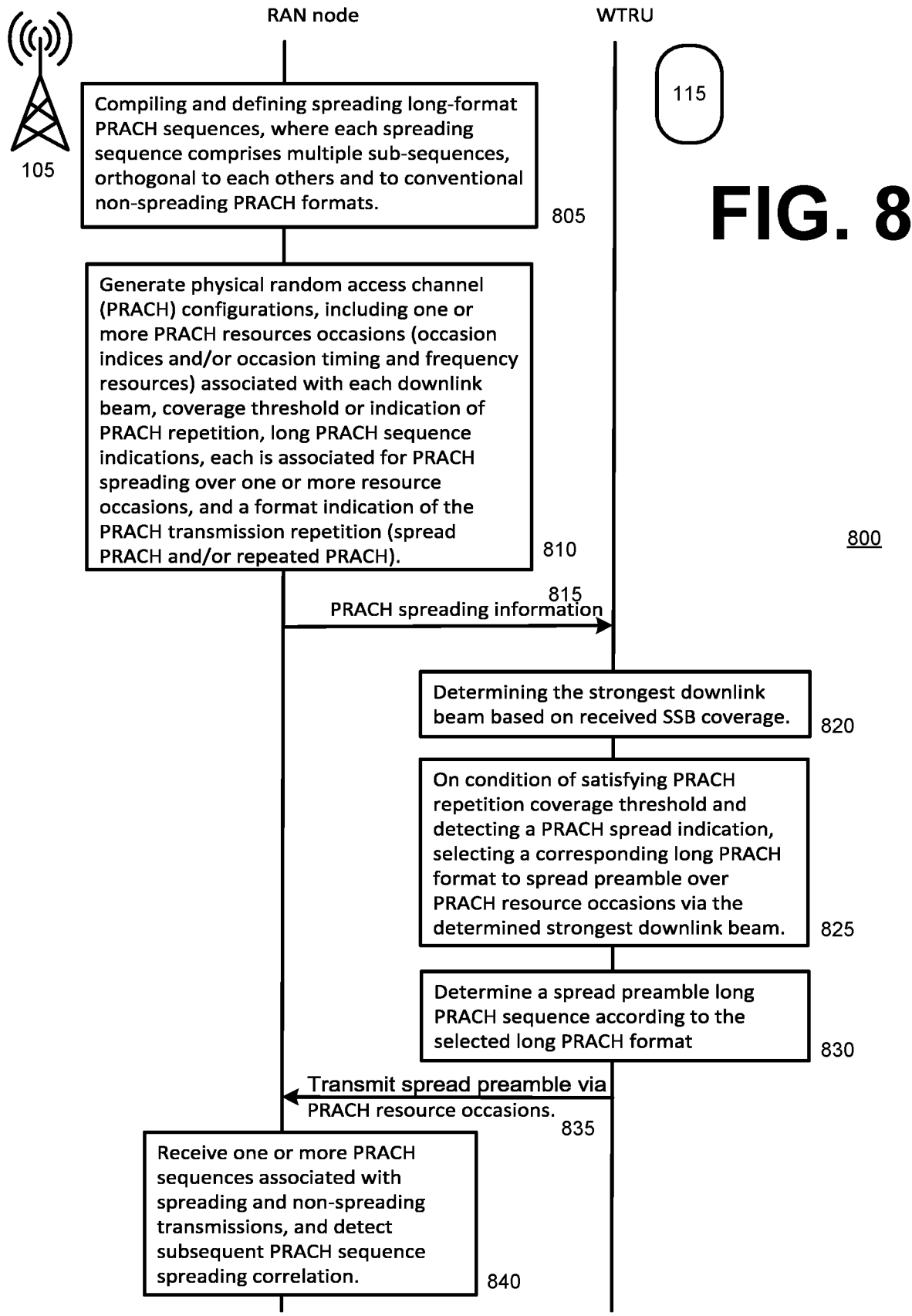
FIG. 8 illustrates a timing diagram of an example method to use spread PRACH preambles.

Turning now to FIG. 8, the figure illustrates a timing diagram of an example method 800 to use multiple PRACH resources to transmit a PRACH spread-preamble. At act 805 RAN node 105 may compile and define long-format PRACH spreading sequences for spread-preambles, where each spreading sequence may comprise multiple sub-sequences orthogonal to each other and orthogonal to conventional non-spread PRACH preamble formats. At act 810 RAN node 105 may generate physical random access channel configurations UEs, such as UE 115. A random access channel configuration may comprise an indication of one or more PRACH resources occasions (possibly including occasion indices and/or indication of occasion timing and frequency resources) associated with downlink beams corresponding to the RAN, a coverage threshold or indication of PRACH when to invoke a repetition or transmitting or a preamble, an indication of a long PRACH sequence, or sequence (with sequences being generated for PRACH preamble spreading over one or more resource occasions), and a format indication of the PRACH transmission repetition (e.g., a format being a PRACH spread-preamble or a repeated PRACH such as described in reference to FIGS. 3, 4, and 9). The physical random access channel configuration, or random access channel configuration, may be transmitted to UE 115 at act 815.

After receiving the configuration transmitted at act 815, UE 115 may determine at act 820 a strongest downlink beam based on received SSB information corresponding to one or more downlink beams corresponding to RAN 105. On condition of not satisfying a minimum coverage criterion, such as coverage threshold, and detecting a PRACH preamble spreading indication, UE 115 at act 825 may select a corresponding long PRACH preamble format from configured long preamble formats, for spreading of a preamble selected at act 830 over a determined uplink occasions. A number of uplink PRACH occasions to use for transmitting a spread-preamble may be determined based on a signal strength of the strongest determined beam—for weaker beams more sub-occasions, such as sub-occasions as described in reference to FIG. 7, may be used such that more energy is used to transmit spread-preamble portions inversely proportionally to the determined strength of a strongest downlink beam of the UE. UE 115 transmits at act 935 the selected long PRACH sequence (e.g., portions of a PRACH spread-preamble) over PRACH resource occasions that may have been determined at act 825. RAN node 105 may receive one or more PRACH sequences, or preamble portions, that may be spread-preamble portions or non-spread preamble portions and detect at act 840 subsequent PRACH spread-preamble portions using a process such as decorrelation.

Figure 11:
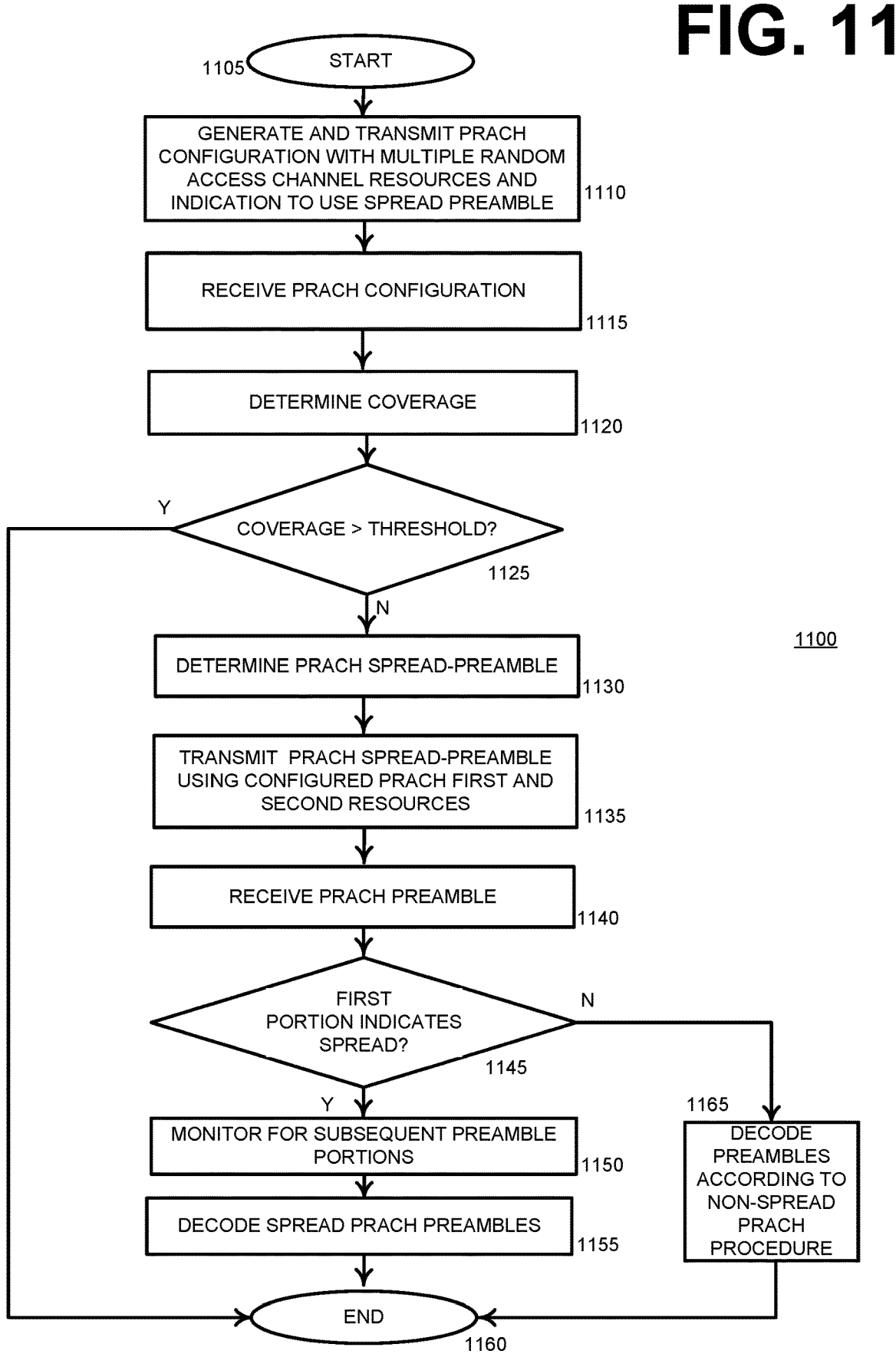
FIG. 11 illustrates a flow diagram of an example method to use spread PRACH preambles.

Turning now to FIG. 11, the figure illustrates a flow diagram of an example method 1100 to use multiple PRACH resources to transmit a spread-preamble. Method 1100 begins at act 1105. At act 1110 a RAN generates a physical random access channel configuration that may include one or more PRACH resource occasions (e.g., occasion indices, occasion timing, or occasion frequency resources) associated with downlink beams. The configuration may comprise a coverage threshold or indication of PRACH repetition, and indications of long PRACH sequences that may be spread over one or more resource occasions. The configuration may comprise a format indication of a type of PRACH transmission repetition (e.g., a spread PRACH as described in reference to FIGS. 7, 8, and 11, or a repeated PRACH as described in reference to FIGS. 3, 4, and 9). A user equipment receives the configuration at act 1115. At act 1120 the user equipment determines a coverage of a strongest downlink signal and determines at act 1125 whether the determined coverage satisfies a coverage threshold. If the determined coverage satisfies the criterion, or threshold, method 1100 advances to act 1160 and ends.

If, however, the user equipment determines at act 1125 that the determined coverage does not satisfy the threshold (e.g., the determined strongest available downlink beam does not have a signal strength that satisfies the criterion that may be part of the configuration received at act 1115), the user equipment determines at act 1130 a physical random access channel spread preamble from the configuration received at act 1115. At act 1135 the user equipment transmits the spread preamble selected at act 1130 to the RAN via resources configured by a configuration, which may comprise the configuration received at act 1115.

At act 1140 the RAN receives the preamble that was transmitted at act 1135. At act 1145 the ran determines whether a first portion of the preamble that was received at act 1140 indicates a spread preamble for that second and subsequent preamble portions that may follow. If the determination at act 1145 is no, that the preamble portion received at act 1140 does not correspond to a spread preamble, method 1100 advances to act 1165. At act 1165 the RAN decodes the preamble received at act 1140 according to a PRACH non-spread preamble procedure (e.g., the RAN evaluates the preamble portion received at act 1140 according to conventional PRACH preamble procedures).

If, however, a determination is made at act 1145 that the first preamble portion received at act 1140 corresponds to a physical random access channel spread-preamble, method 1100 advances to act 1150. At act 1150 the RAN monitors at act 1155 subsequent preamble portions, that may be portions of the preamble determined, or selected, at act 1130 by the user equipment. The RAN decodes or combines the multiple spread preamble portions that were transmitted, or spread, among multiple physical random access channel uplink occasions. Thus, by spreading the preamble determined by the user equipment at act 1140 over multiple uplink occasions more uplink energy is used to transmit the preamble that was determined at act 1040 thus improving the decoding by the RAN of the preamble that was transmitted by the user equipment that had a coverage that did not satisfy the coverage criterion at act 1125. Accordingly, even though the user equipment did not have a downlink beam available with a signal strength value that satisfied the coverage criteria at act 1125, the user equipment may nevertheless be able to transmit a physical random access channel preamble and have it successfully decoded by the RAN without having to wait a period equal to a periodicity of another occasion for transmitting a physical random access channel preamble. Method 1100 advances to act 1160 and ends.

Figure 12:
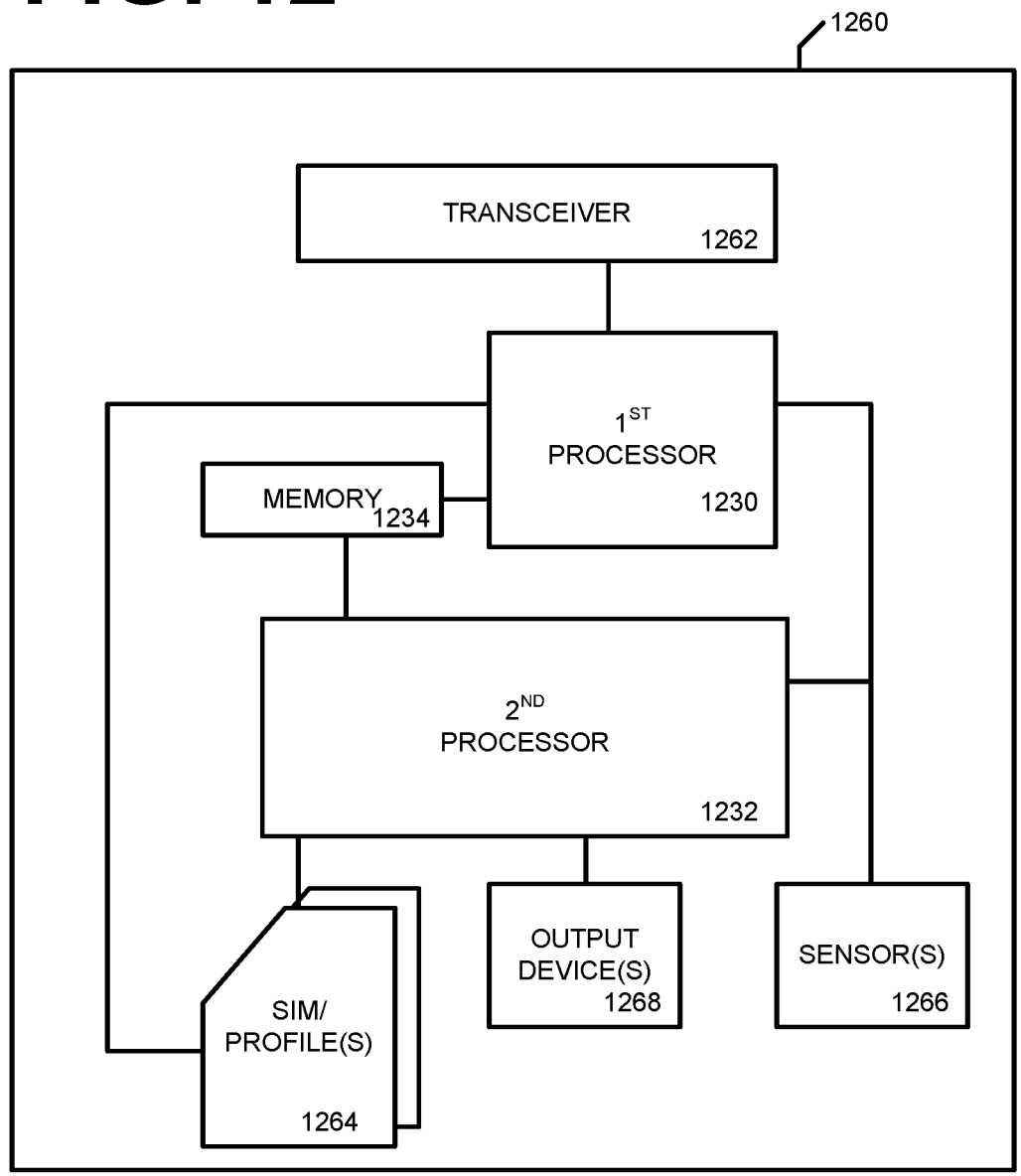
FIG. 12 illustrates a block diagram of an example wireless UE.

Turning now to FIG. 12, the figure illustrates a block diagram of an example UE 1260. UE 1260 may comprise a smart phone, a wireless tablet, a laptop computer with wireless capability, a wearable device, a machine device that may facilitate vehicle telematics, and the like. UE 1260 comprises a first processor 1230, a second processor 1232, and a shared memory 1234. UE 1260 includes radio front end circuitry 1262, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1262 may comprise multiple sets of circuitry or may be tunable to accommodate different frequency ranges, different modulations schemes, or different communication protocols, to facilitate long-range wireless links, such as links 125, device-to-device links, such as links 135, and short-range wireless links, such as links 137.

Continuing with description of FIG. 12, UE 1260 may also include a SIM 1264, or a SIM profile, which may comprise information stored in a memory (memory 1234 or a separate memory portion), for facilitating wireless communication with RAN 105 or core network 130 shown in FIG. 1. FIG. 12 shows SIM 1264 as a single component in the shape of a conventional SIM card, but it will be appreciated that SIM 1264 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1264 and another device, which may be a component of RAN 105 or core network 130 shown in FIG. 1). A SIM profile 1264 may also comprise identifying information that is unique to the SIM, or SIM profile, such as, for example, an International Mobile Subscriber Identity ("IMSI") or information that may make up an IMSI.

SIM 1264 is shown coupled to both the first processor portion 1230 and the second processor portion 1232. Such an implementation may provide an advantage that first processor portion 1230 may not need to request or receive information or data from SIM 1264 that second processor 1232 may request, thus eliminating the use of the first processor acting as a 'go-between' when the second processor uses information from the SIM in performing its functions and in executing applications. First processor 1230, which may be a modem processor or baseband processor, is shown smaller than processor 1232, which may be a more sophisticated application processor, to visually indicate the relative levels of sophistication (i.e., processing capability and performance) and corresponding relative levels of operating power consumption levels between the two processor portions. Keeping the second processor portion 1232 asleep/inactive/in a low power state when UE 1260 does not need it for executing applications and processing data related to an application provides an advantage of reducing power consumption when the UE only needs to use the first processor portion 1230 while in listening mode for monitoring routine configured bearer management and mobility management/maintenance procedures, or for monitoring search spaces that the UE has been configured to monitor while the second processor portion remains inactive/asleep.

UE 1260 may also include sensors 1266, such as, for example, temperature sensors, accelerometers, gyroscopes, barometers, moisture sensors, Global Positioning Satellite circuitry, and the like that may provide signals to the first processor 1230 or second processor 1232. Output devices 1268 may comprise, for example, one or more visual displays (e.g., computer monitors, VR appliances, and the like), acoustic transducers, such as speakers or microphones, vibration components, and the like. Output devices 1268 may comprise software that interfaces with output devices, for example, visual displays, speakers, microphones, touch sensation devices, smell or taste devices, and the like, that are external to UE 1260.

Figure 13:
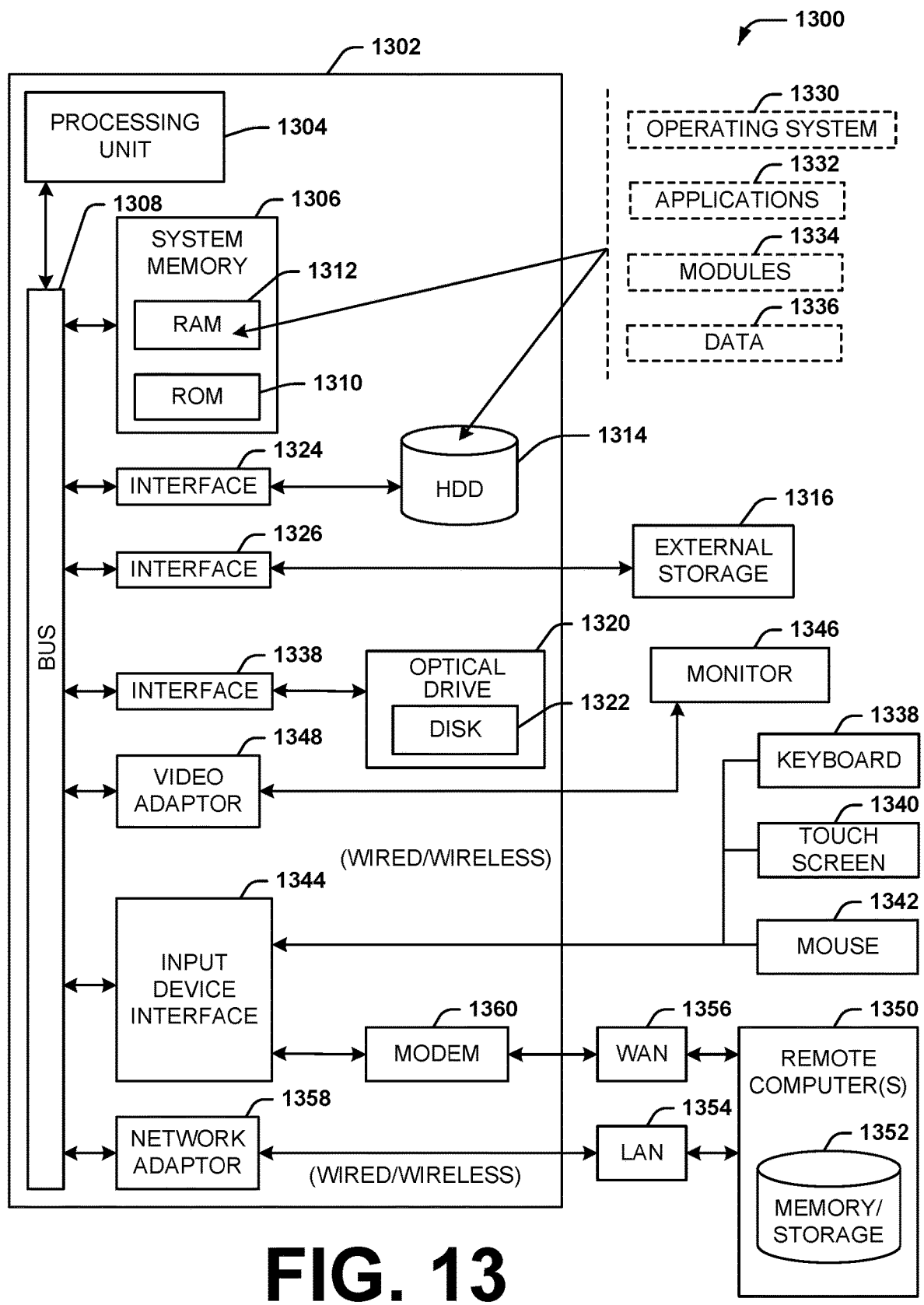
FIG. 13 illustrates an example computer environment.

In order to provide additional context for various embodiments described herein, FIG. 13 and the following discussion are intended to provide a brief, general description of a suitable computing environment 1300 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors and may include a cache memory. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

Computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid-state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can comprise a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 14:
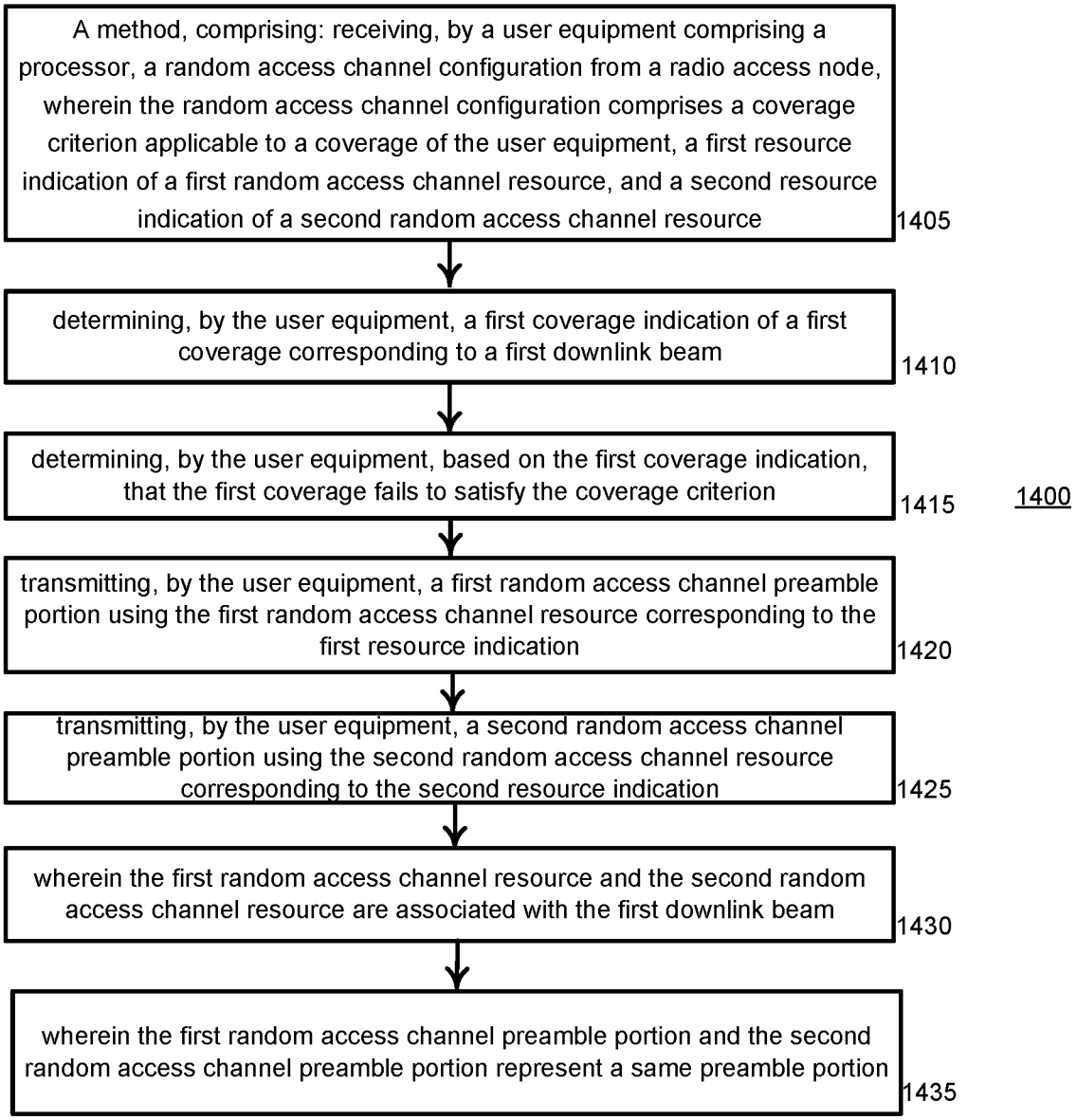
FIG. 14 illustrates a block diagram of an example method.

Turning now to FIG. 14, the figure illustrates an example embodiment method 1400 comprising at block 1405 receiving, by a user equipment comprising a processor, a random access channel configuration from a radio access node, wherein the random access channel configuration comprises a coverage criterion applicable to a coverage of the user equipment, a first resource indication of a first random access channel resource, and a second resource indication of a second random access channel resource; at block 1410 determining, by the user equipment, a first coverage indication of a first coverage corresponding to a first downlink beam; at block 1415 determining, by the user equipment, based on the first coverage indication, that the first coverage fails to satisfy the coverage criterion; at block 1420 transmitting, by the user equipment, a first random access channel preamble portion using the first random access channel resource corresponding to the first resource indication; at block 1425 transmitting, by the user equipment, a second random access channel preamble portion using the second random access channel resource corresponding to the second resource indication; at block 1430 wherein the first random access channel resource and the second random access channel resource are associated with the first downlink beam; and at block 1435 wherein the first random access channel preamble portion and the second random access channel preamble portion represent a same preamble portion.

Figure 15:
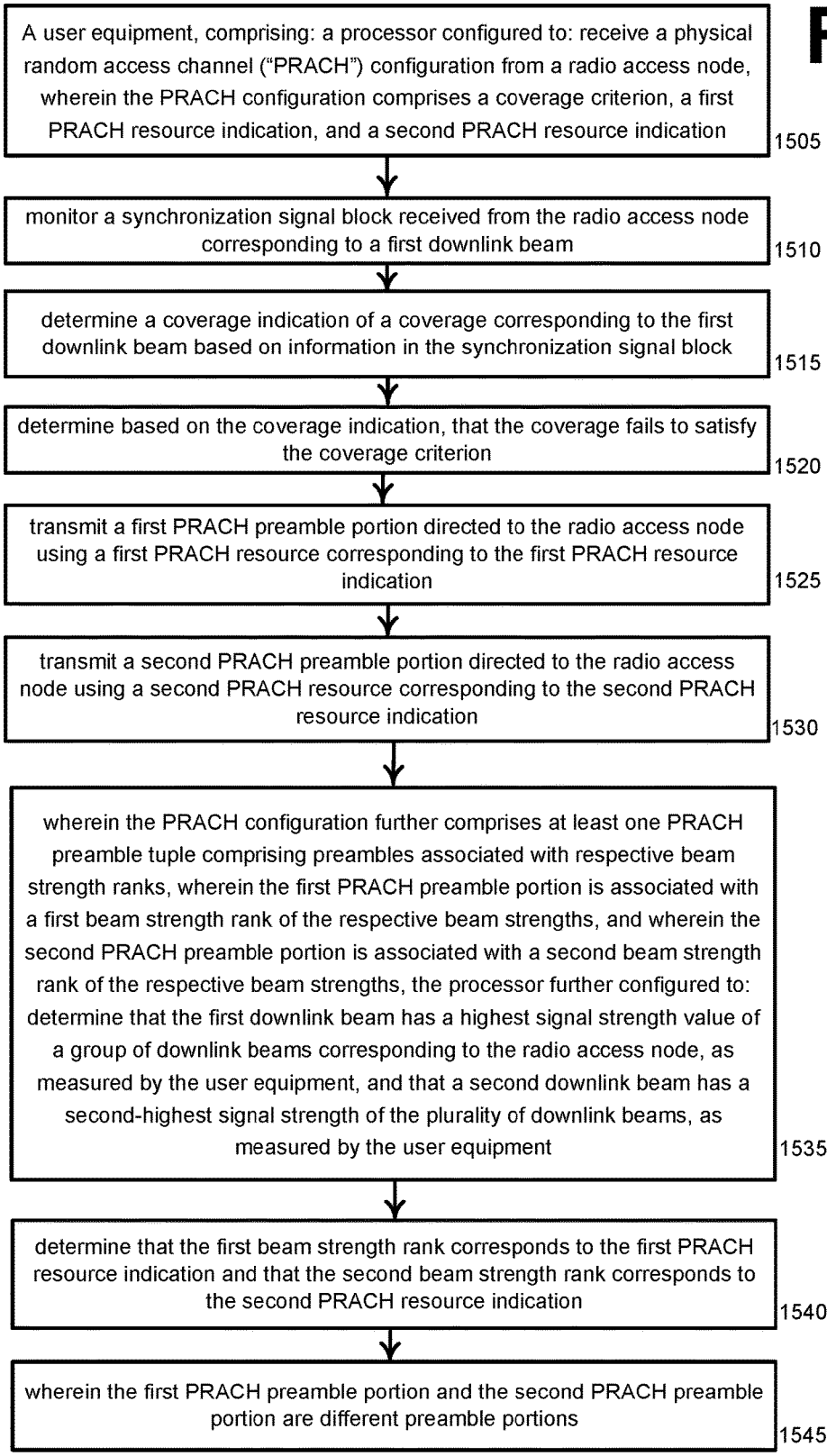
FIG. 15 illustrates a block diagram of an example system.

Turning now to FIG. 15, the figure illustrates an example system embodiment 1500 comprising at block 1505 a user equipment, comprising a processor configured to: receive a physical random access channel ("PRACH") configuration from a radio access node, wherein the PRACH configuration comprises a coverage criterion, a first PRACH resource indication, and a second PRACH resource indication; at block 1510 monitor a synchronization signal block received from the radio access node corresponding to a first downlink beam; at block 1515 determine a coverage indication of a coverage corresponding to the first downlink beam based on information in the synchronization signal block; at block 1520 determine based on the coverage indication, that the coverage fails to satisfy the coverage criterion; at block 1525 transmit a first PRACH preamble portion directed to the radio access node using a first PRACH resource corresponding to the first PRACH resource indication; at block 1530 transmit a second PRACH preamble portion directed to the radio access node using a second PRACH resource corresponding to the second PRACH resource indication; at block 1535 wherein the PRACH configuration further comprises at least one PRACH preamble tuple comprising preambles associated with respective beam strength ranks, wherein the first PRACH preamble portion is associated with a first beam strength rank of the respective beam strengths, and wherein the second PRACH preamble portion is associated with a second beam strength rank of the respective beam strengths, the processor further configured to: determine that the first downlink beam has a highest signal strength value of a group of downlink beams corresponding to the radio access node, as measured by the user equipment, and that a second downlink beam has a second-highest signal strength of the plurality of downlink beams, as measured by the user equipment; at block 1540 determine that the first beam strength rank corresponds to the first PRACH resource indication and that the second beam strength rank corresponds to the second PRACH resource indication; and at block 1545 wherein the first PRACH preamble portion and the second PRACH preamble portion are different preamble portions.

Figure 16:
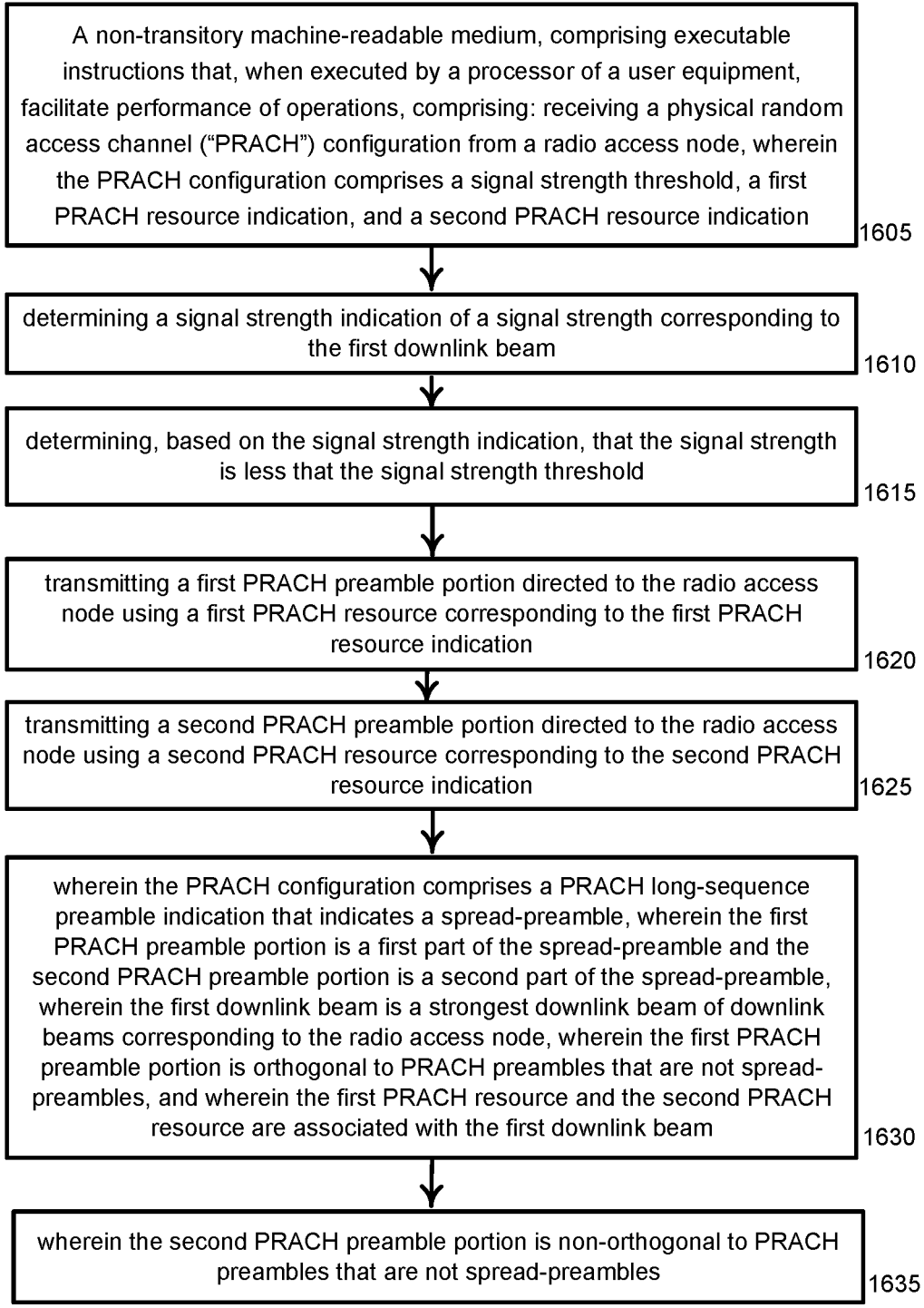
FIG. 16 illustrates a block diagram of an example non-transitory machine-readable medium embodiment.

Turning now to FIG. 16, the figure illustrates a non-transitory machine-readable medium 1600 comprising at block 1605 executable instructions that, when executed by a processor of a user equipment, facilitate performance of operations, comprising: receiving a physical random access channel ("PRACH") configuration from a radio access node, wherein the PRACH configuration comprises a signal strength threshold, a first PRACH resource indication, and a second PRACH resource indication; ay block 1610 determining a signal strength indication of a signal strength corresponding to the first downlink beam; at block 1615 determining, based on the signal strength indication, that the signal strength is less that the signal strength threshold; 1620 transmitting a first PRACH preamble portion directed to the radio access node using a first PRACH resource corresponding to the first PRACH resource indication; at block 1625 transmitting a second PRACH preamble portion directed to the radio access node using a second PRACH resource corresponding to the second PRACH resource indication; at block 1630 wherein the PRACH configuration comprises a PRACH long-sequence preamble indication that indicates a spread-preamble, wherein the first PRACH preamble portion is a first part of the spread-preamble and the second PRACH preamble portion is a second part of the spread-preamble, wherein the first downlink beam is a strongest downlink beam of downlink beams corresponding to the radio access node, wherein the first PRACH preamble portion is orthogonal to PRACH preambles that are not spread-preambles, and wherein the first PRACH resource and the second PRACH resource are associated with the first downlink beam; and at block 1635 wherein the second PRACH preamble portion is non-orthogonal to PRACH preambles that are not spread-preambles.

Figure 17:
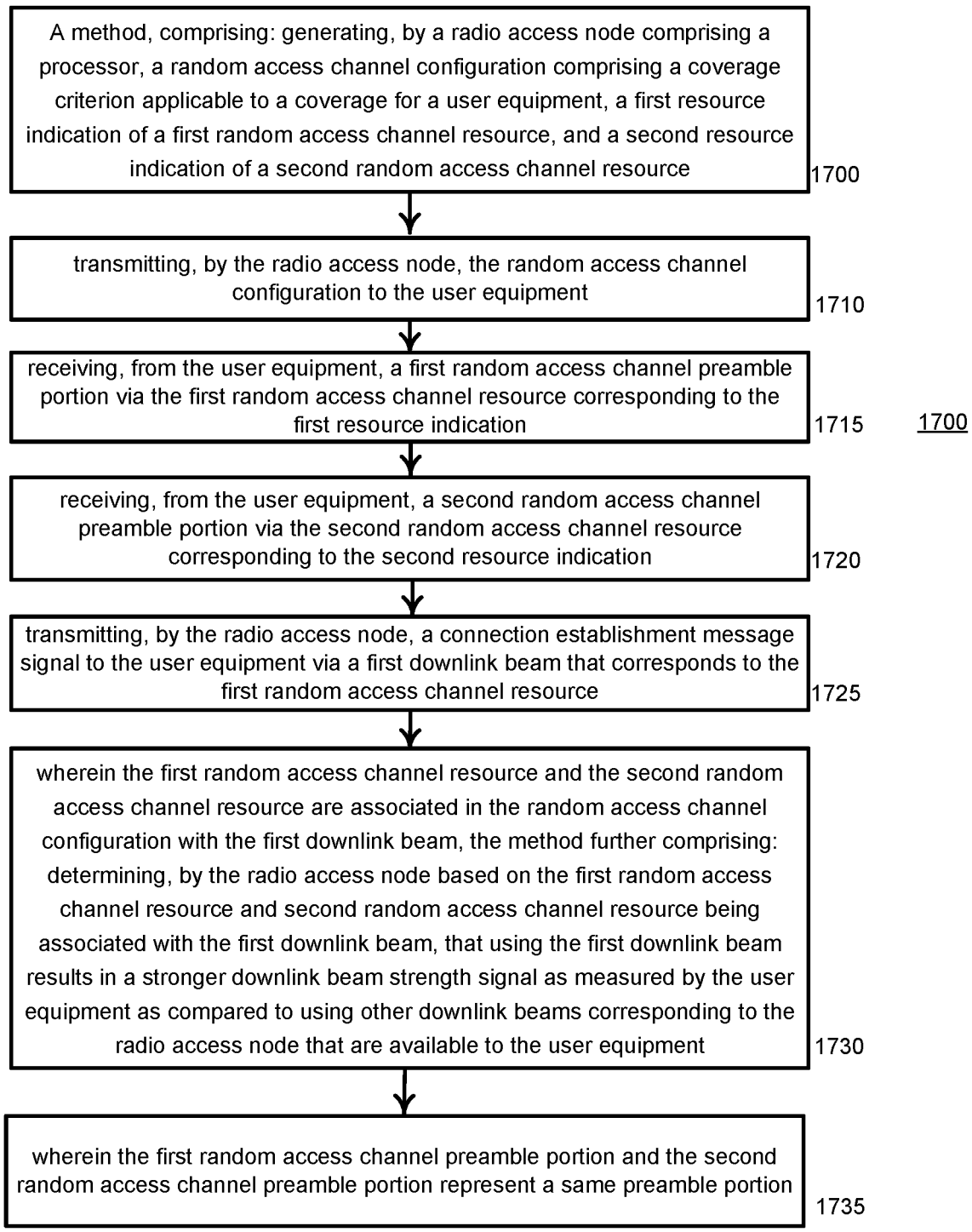
FIG. 17 illustrates a block diagram of an example method.

Turning now to FIG. 17, the figure illustrates an example embodiment method 1700 comprising at block 1705 generating, by a radio access node comprising a processor, a random access channel configuration comprising a coverage criterion applicable to a coverage for a user equipment, a first resource indication of a first random access channel resource, and a second resource indication of a second random access channel resource; at block 1710 transmitting, by the radio access node, the random access channel configuration to the user equipment; at block 1715 receiving, from the user equipment, a first random access channel preamble portion via the first random access channel resource corresponding to the first resource indication; at block 1720 receiving, from the user equipment, a second random access channel preamble portion via the second random access channel resource corresponding to the second resource indication; at block 1725 transmitting, by the radio access node, a connection establishment message signal to the user equipment via a first downlink beam that corresponds to the first random access channel resource; at block 1730 wherein the first random access channel resource and the second random access channel resource are associated in the random access channel configuration with the first downlink beam, the method further comprising: determining, by the radio access node based on the first random access channel resource and second random access channel resource being associated with the first downlink beam, that using the first downlink beam results in a stronger downlink beam strength signal as measured by the user equipment as compared to using other downlink beams corresponding to the radio access node that are available to the user equipment; and at block wherein the first random access channel preamble portion and the second random access channel preamble portion represent a same preamble portion.

Figure 18:
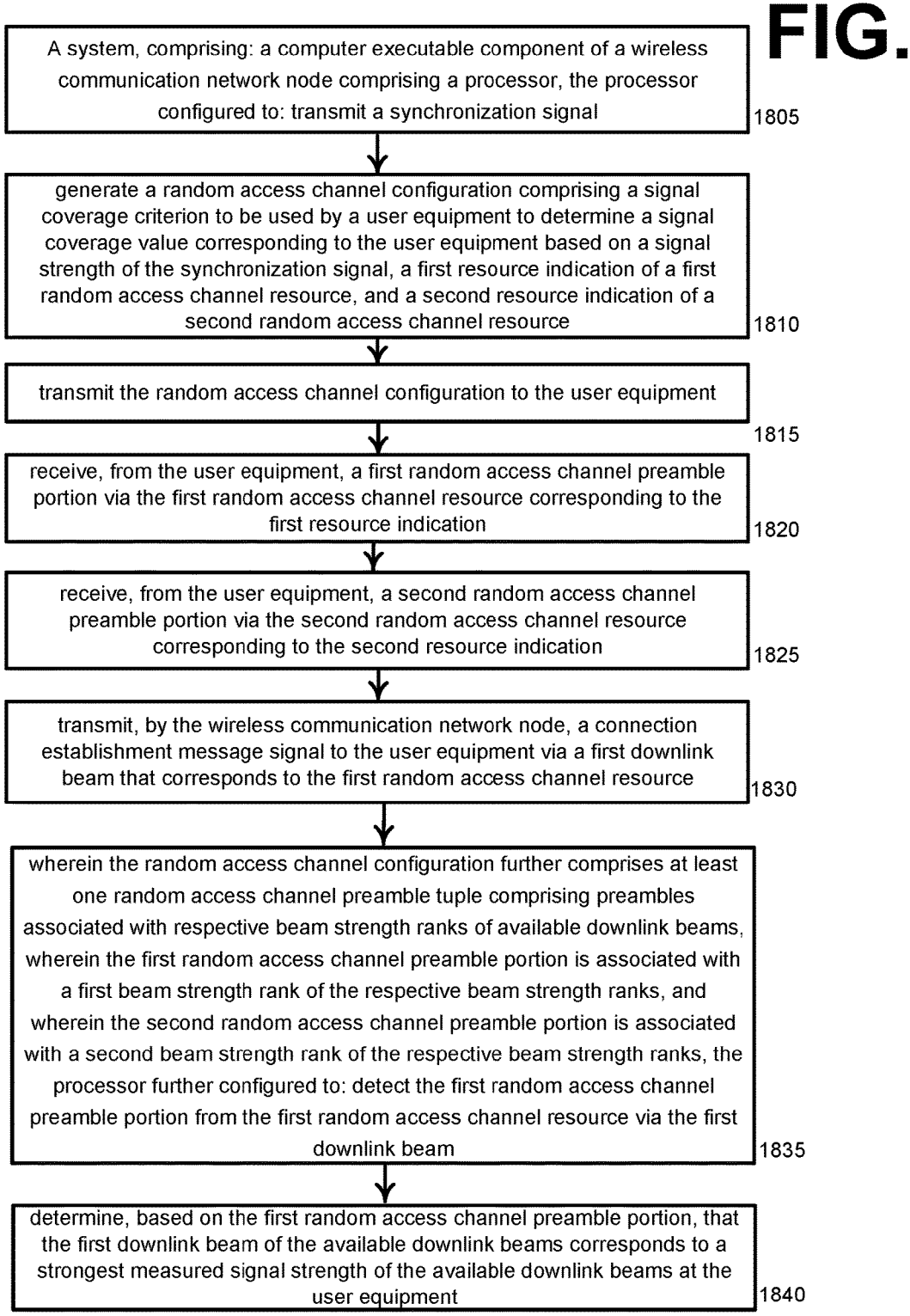
FIG. 18 illustrates a block diagram of an example system.

Turning now to FIG. 18, the figure illustrates an example system embodiment 1800 comprising at block 1805 a computer executable component of a wireless communication network node comprising a processor, the processor configured to: transmit a synchronization signal; at block 1810 generate a random access channel configuration comprising a signal coverage criterion to be used by a user equipment to determine a signal coverage value corresponding to the user equipment based on a signal strength of the synchronization signal, a first resource indication of a first random access channel resource, and a second resource indication of a second random access channel resource; at block 1815 transmit the random access channel configuration to the user equipment; at block 1820 receive, from the user equipment, a first random access channel preamble portion via the first random access channel resource corresponding to the first resource indication; at block 1825 receive, from the user equipment, a second random access channel preamble portion via the second random access channel resource corresponding to the second resource indication; at block 1830 transmit, by the wireless communication network node, a connection establishment message signal to the user equipment via a first downlink beam that corresponds to the first random access channel resource; at block 1835 wherein the random access channel configuration further comprises at least one random access channel preamble tuple comprising preambles associated with respective beam strength ranks of available downlink beams, wherein the first random access channel preamble portion is associated with a first beam strength rank of the respective beam strength ranks, and wherein the second random access channel preamble portion is associated with a second beam strength rank of the respective beam strength ranks, the processor further configured to: detect the first random access channel preamble portion from the first random access channel resource via the first downlink beam; and at block 1840 determine, based on the first random access channel preamble portion, that the first downlink beam of the available downlink beams corresponds to a strongest measured signal strength of the available downlink beams at the user equipment.

Figure 19A:
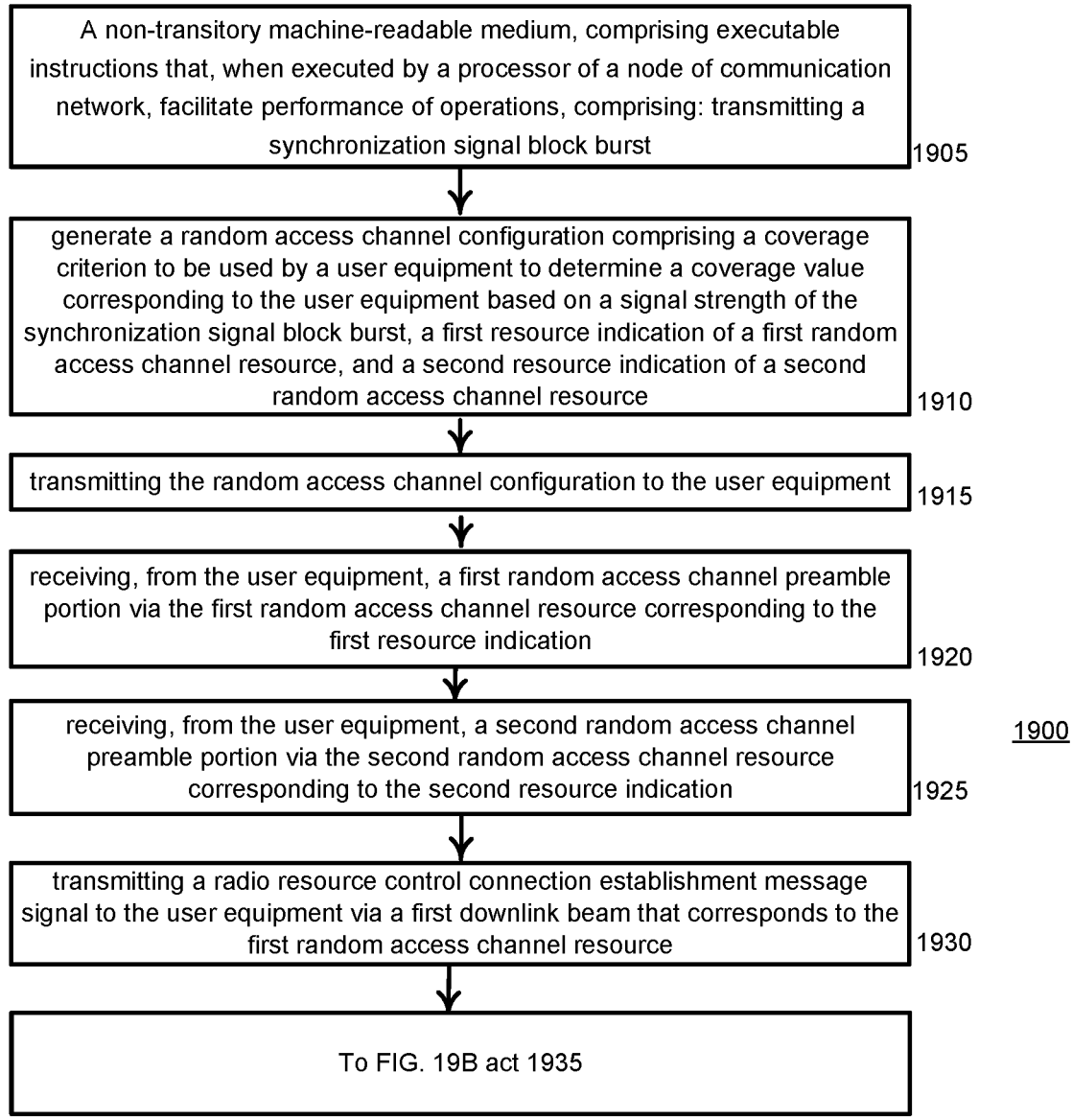
FIG. 19A illustrates a block diagram of an example non-transitory machine-readable medium embodiment.

Turning now to FIG. 19A, the figure illustrates a non-transitory machine-readable medium 1900 comprising at block 1905 executable instructions that, when executed by a processor of a node of communication network, facilitate performance of operations, comprising: transmitting a synchronization signal block burst; at block 1910 generate a random access channel configuration comprising a coverage criterion to be used by a user equipment to determine a coverage value corresponding to the user equipment based on a signal strength of the synchronization signal block burst, a first resource indication of a first random access channel resource, and a second resource indication of a second random access channel resource; at block 1915 transmitting the random access channel configuration to the user equipment; at block 1920 receiving, from the user equipment, a first random access channel preamble portion via the first random access channel resource corresponding to the first resource indication; at block 1925 receiving, from the user equipment, a second random access channel preamble portion via the second random access channel resource corresponding to the second resource indication; and at block 1930 transmitting a radio resource control connection establishment message signal to the user equipment via a first downlink beam that corresponds to the first random access channel resource. Illustration of non-transitory machine-readable medium 1900 continues on FIG. 19B at block 1935 wherein the random access channel configuration comprises a random access channel long-sequence preamble indication that indicates a spread-preamble format and spread-preambles generated according to the spread-preamble format, wherein the first random access channel preamble portion corresponds to a first part of a first spread-preamble and the second random access channel preamble portion corresponds to a second part of the first spread-preamble, wherein the first random access channel preamble portion is orthogonal to random access channel preambles that are not generated according to the spread-preamble format, and wherein the random access channel configuration further comprises a set of configured non-spread-preamble first set portions, a set of configured spread-preamble first preamble portions, and a set of configured spread-preamble second preamble portions, the operations further comprising: analyzing the first random access channel preamble portion with respect to the set of configured spread-preamble first preamble portions and the set of configured non-spread-preamble first preamble portions to result in an analyzed first random access channel preamble portion and to determine that the first random access channel preamble portion corresponds to a spread-preamble; at block 1940 analyzing the second random access channel preamble portion with respect to the set of configured spread-preamble second preamble portions without analyzing the second random access channel preamble portion with respect to the set of configured non-spread-preamble first preamble portions to result in an analyzed second random access channel preamble portion; at block 1945 combining the analyzed first random access channel preamble portion and the analyzed second random access channel preamble portion to result in a composite random access channel preamble that comprises one of the spread-preambles; and at block 1950 wherein the first random access channel preamble portion and the second random access channel preamble portion are received via the first random access channel resource and second random access channel resource, respectively, and wherein the first random access channel resource and second random access channel resource correspond to the first downlink beam.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |

TABLE 1-continued

| Term | Definition |
|---|---|
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| WTRU | Wireless transmit receive unit |
| URLLC | Ultra reliable and low latency communication |
| CBR | Channel busy ratio |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| BS | Base-station |
| gNB | General NodeB |
| PUCCH | Physical uplink control channel |
| PUSCH | Physical uplink shared channel |
| SRS | Sounding reference signal |
| PRACH | Physical random access channel |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   generating, by a radio access node comprising a processor, a random access channel configuration comprising a coverage criterion applicable to a coverage for a user equipment, a first resource indication of a first random access channel resource, and a second resource indication of a second random access channel resource, wherein the random access channel configuration further comprises at least one random access channel preamble tuple comprising preambles associated with respective beam strength ranks of available downlink beams;
   transmitting, by the radio access node, the random access channel configuration to the user equipment;
   receiving, from the user equipment, a first random access channel preamble portion via the first random access channel resource corresponding to the first resource indication, wherein the first random access channel preamble portion is associated with a first beam strength rank of the respective beam strength ranks;
   receiving, from the user equipment, a second random access channel preamble portion via the second random access channel resource corresponding to the second resource indication, wherein the second random access channel preamble portion is associated with a second beam strength rank of the respective beam strength ranks;
   detecting, by the radio access node, the second random access channel preamble portion from the second random access channel resource without detecting the first random access channel preamble portion;
   determining, by the radio access node based on the detecting of the second random access channel preamble portion, that using a second downlink beam of the available downlink beams corresponding to the second random access channel preamble portion results in a second strongest measured signal strength of the available downlink beams at the user equipment;
   transmitting, by the radio access node to the user equipment, a connection establishment message via the second downlink beam;
   transmitting, by the radio access node via the second downlink beam, a downlink beam strength report request to the user equipment that requests an indication of a strongest downlink beam of the available downlink beams, the usage of which results in a strongest measured signal strength of the available downlink beams at the user equipment;
   receiving, by the radio access node in response to the downlink beam strength report request, the indication of the strongest downlink beam of the available downlink beams at the user equipment;
   based on the indication of the strongest downlink beam of the available downlink beams assigning, by the radio access node, the strongest downlink beam to be a first downlink beam; and
   transmitting, by the radio access node, a connection establishment message signal to the user equipment via the first downlink beam that corresponds to the first random access channel resource.

2. The method of claim 1, wherein the coverage criterion comprises a value corresponding to a signal strength parameter to be used by the user equipment to determine whether a measured signal strength value corresponding to the signal strength parameter satisfies a minimum beam performance.

3. The method of claim 1, wherein the first random access channel resource and the second random access channel resource are associated in the random access channel configuration with the first downlink beam, the method further comprising:
   before the receiving, by the radio access node in response to the downlink beam strength report request, the indication of the strongest downlink beam of the available downlink beams at the user equipment, determining, by the radio access node based on the first random access channel resource and second random access channel resource being associated with the first downlink beam, that using the first downlink beam results in a stronger downlink beam strength signal as measured by the user equipment as compared to using other downlink beams corresponding to the radio access node that are available to the user equipment.

4. The method of claim 1, wherein the first random access channel preamble portion and the second random access channel preamble portion represent a same preamble portion.

5. The method of claim 1, further comprising:
detecting, by the radio access node, the first random access channel preamble portion from the first random access channel resource; and
determining, by the radio access node, that using the first downlink beam results in a strongest measured signal strength at the user equipment.

6. The method of claim 1, wherein the random access channel configuration comprises a random access channel long-sequence preamble indication that indicates a spread-preamble, and wherein the first random access channel preamble portion is a first part of the spread-preamble and the second random access channel preamble portion is a second part of the spread-preamble.

7. The method of claim 6, wherein the first random access channel preamble portion is orthogonal to random access channel preambles that are not spread-preambles.

8. The method of claim 6, wherein the random access channel configuration further comprises a group of configured non-spread-preamble first preamble portions, a group of configured spread-preamble first preamble portions, and a group of configured spread-preamble second preamble portions, the method further comprising:
determining, by the radio access node, that the first random access channel preamble portion received via the first random access channel resource corresponds to a spread-preamble, wherein the determining comprises analyzing the first random access channel preamble portion with respect to the group of configured spread-preamble first preamble portions and analyzing the first random access channel preamble portion with respect to the group of configured non-spread-preamble first preamble portions; and
decoding, by the radio access node, the second random access channel preamble portion, wherein the decoding comprises analyzing the second random access channel preamble portion with respect to the group of configured spread-preamble second preamble portions without analyzing the second random access channel preamble portion with respect to the group of configured non-spread-preamble first preamble portions.

9. A system, comprising:
a computer executable component of a wireless communication network node comprising a processor, the processor configured to:
transmit a synchronization signal;
generate a random access channel configuration comprising a signal coverage criterion to be used by a user equipment to determine a signal coverage value corresponding to the user equipment based on a signal strength of the synchronization signal, a first resource indication of a first random access channel resource, and a second resource indication of a second random access channel resource, wherein the random access channel configuration further comprises at least one random access channel preamble tuple comprising preambles associated with respective beam strength ranks of available downlink beams;
transmit the random access channel configuration to the user equipment;
receive, from the user equipment, a first random access channel preamble portion via the first random access channel resource corresponding to the first resource indication, wherein the first random access channel preamble portion is associated with a first beam strength rank of the respective beam strength ranks;
receive, from the user equipment, a second random access channel preamble portion via the second random access channel resource corresponding to the second resource indication, wherein the second random access channel preamble portion is associated with a second beam strength rank of the respective beam strength ranks;
detect the second random access channel preamble portion from the second random access channel resource via a second downlink beam, of the available downlink beams, associated with the second random access channel resource in the random access channel configuration, without the first random access channel preamble portion being detected;
determine, based on the second random access channel preamble portion, that the second downlink beam provides a second strongest measured signal strength of the available downlink beams at the user equipment;
transmit, by the radio access node to the user equipment, a connection establishment message via the second downlink beam;
transmit, via the second downlink beam, a downlink beam reporting indication to the user equipment that comprises a request that the user equipment indicate available downlink beams and corresponding measured signal strengths;
receive, from the user equipment in response to the downlink beam reporting indication, a downlink beam signal strength report comprising an indication of downlink beams available at the user equipment and respective signal strengths corresponding to the downlink beams;
identify, for use as a first downlink beam, a downlink beam having a corresponding strongest signal strength of the downlink beams indicated in the downlink beam signal strength report; and
transmit, by the wireless communication network node, a connection establishment message signal to the user equipment via the first downlink beam that corresponds to the first random access channel resource.

10. The system of claim 9, wherein the first random access channel resource and the second random access channel resource are associated, in the random access channel configuration, with the first downlink beam, the processor further configured to:
determine, based on the first random access channel resource and the second random access channel resource being associated with the first downlink beam, that the first downlink beam corresponds to a stronger downlink beam strength signal measured by the user equipment than other downlink beams, other than the first downlink beam and corresponding to the radio access node that are available to the user equipment.

11. The system of claim 9, wherein the processor is further configured to:
detect the first random access channel preamble portion from the first random access channel resource via the first downlink beam; and
determine, based on the first random access channel preamble portion, that the first downlink beam of the available downlink beams corresponds to a strongest measured signal strength of the available downlink beams at the user equipment.

12. The system of claim 9, wherein the random access channel configuration comprises a random access channel long-sequence preamble indication that indicates a spread-preamble format and spread-preambles generated according to the spread-preamble format, wherein the first random access channel preamble portion corresponds to a first part of a first spread-preamble and the second random access channel preamble portion corresponds to a second part of the first spread-preamble, and wherein the first random access channel preamble portion is orthogonal to random access channel preambles that do not correspond to the spread-preamble format.

13. The system of claim 12, wherein the random access channel configuration further comprises multiple configured non-spread-preamble first preamble portions, multiple configured spread-preamble first preamble portions, and multiple configured spread-preamble second preamble portions, the processor further configured to:

analyze the first random access channel preamble portion with respect to the multiple configured spread-preamble first preamble portions and the multiple configured non-spread-preamble first preamble portions to determine that the first random access channel preamble portion corresponds to a spread-preamble; and analyze the second random access channel preamble portion with respect to the multiple configured spread-preamble second preamble portions without analyzing the second random access channel preamble portion with respect to the multiple configured non-spread-preamble first preamble portions;

wherein the first random access channel preamble portion and the second random access channel preamble portion are received via the first random access channel resource and the second random access channel resource, respectively, that correspond to the first downlink beam.

14. A non-transitory machine-readable medium, comprising executable instructions that, when executed by a processor of a node of communication network, facilitate performance of operations, comprising:

transmitting a synchronization signal block burst;

generate a random access channel configuration comprising a coverage criterion to be used by a user equipment to determine a coverage value corresponding to the user equipment based on a signal strength of the synchronization signal block burst, a first resource indication of a first random access channel resource, and a second resource indication of a second random access channel resource, wherein the random access channel configuration further comprises a random access channel long-sequence preamble indication that indicates a spread-preamble format, spread-preambles generated according to the spread-preamble format, a set of configured non-spread-preamble first set portions, a set of configured spread-preamble first preamble portions, and a set of configured spread-preamble second preamble portions;

transmitting the random access channel configuration to the user equipment;

receiving, from the user equipment, a first random access channel preamble portion via the first random access channel resource corresponding to the first resource indication, wherein the first random access channel preamble portion corresponds to a first part of a first spread-preamble and the second random access channel preamble portion corresponds to a second part of the first spread-preamble;

receiving, from the user equipment, a second random access channel preamble portion via the second random access channel resource corresponding to the second resource indication, wherein the first random access channel preamble portion is orthogonal to random access channel preambles that are not generated according to the spread-preamble format;

analyzing the first random access channel preamble portion with respect to the set of configured spread-preamble first preamble portions and the set of configured non-spread-preamble first preamble portions to result in an analyzed first random access channel preamble portion and to determine that the first random access channel preamble portion corresponds to a spread-preamble;

analyzing the second random access channel preamble portion with respect to the set of configured spread-preamble second preamble portions without analyzing the second random access channel preamble portion with respect to the set of configured non-spread-preamble first preamble portions to result in an analyzed second random access channel preamble portion; and combining the analyzed first random access channel preamble portion and the analyzed second random access channel preamble portion to result in a composite random access channel preamble that comprises one of the spread-preambles, wherein the first random access channel preamble portion and the second random access channel preamble portion are received via the first random access channel resource and second random access channel resource, respectively, and wherein the first random access channel resource and second random access channel resource correspond to the first downlink beam; and transmitting a radio resource control connection establishment message signal to the user equipment via the first downlink beam that corresponds to the first random access channel resource.

15. The non-transitory machine-readable medium of claim 14, wherein, in the random access channel configuration, the first random access channel resource and the second random access channel resource are associated with the first downlink beam, the operations further comprising:

determining, based on the first random access channel resource and the second random access channel resource being associated with the first downlink beam, that the first downlink beam enables a signal having a stronger downlink beam strength measured by the user equipment than second downlink beams, other than the first downlink beam, corresponding to the radio access node, and that are available to the user equipment;

decoding the first random access channel preamble portion and the second random access channel preamble portion to result in a decoded first random access channel preamble portion and a decoded second random access channel preamble portion; respectively; and combining the decoded first random access channel preamble portion and the decoded second random access channel preamble portion to result in a composite random access channel preamble, wherein the composite random access channel preamble comprises the first random access channel preamble portion or the second random access channel preamble portion.

16. The non-transitory machine-readable medium of claim 14, wherein the random access channel configuration further comprises at least one random access channel preamble tuple comprising preambles associated with respective beam strength ranks of available downlink beams, wherein the first random access channel preamble portion is associated with a first beam strength rank of the respective beam strength ranks, and wherein the second random access channel preamble portion is associated with a second beam strength rank of the respective beam strength ranks, the operations further comprising:

detecting the second random access channel preamble portion from the second random access channel resource via a second downlink beam, of the available downlink beams, associated with the second random access channel resource in the random access channel configuration without detecting the first random access channel preamble portion;

determining, based on the detecting of the second random access channel preamble portion, that the second downlink beam provides a second-strongest measured signal strength of the available downlink beams at the user equipment;

transmitting, to the user equipment, a radio resource control connection establishment message signal to the user equipment via the second downlink beam;

transmitting, via the second downlink beam, a downlink beam reporting indication to the user equipment, the downlink beam reporting indication comprising a request that the user equipment indicate downlink beams available at the user equipment;

receiving, from the user equipment in response to the downlink beam reporting indication, a downlink beam signal strength report of the downlink beams available at the user equipment ranked according to signal strength; and deploying a highest ranked downlink beam from the downlink beam signal strength report as the first downlink beam.

17. The non-transitory machine-readable medium of claim 14, wherein the analyzing of the first random access channel preamble portion comprises performing decorrelation with respect to the set of configured non-spread-preamble first preamble portions and the set of configured spread-preamble first preamble portions, wherein the analyzing of the received second random access channel preamble portion comprises performing decorrelation with respect to the set of configured spread-preamble second preamble portions, and wherein the analyzing of the second random access channel preamble portion does not comprise performing decorrelation with respect to the set of configured spread-preamble first preamble portions.

18. The method of claim 1, wherein the radio access network node receives the first random access channel preamble portion without detecting the first random access channel preamble portion due to at least one collision resulting from a different user equipment, other than the user equipment, transmitting to the radio access network node the first random access channel preamble portion.

19. The system of claim 9, wherein the first random access channel preamble portion is received without being detected due to at least one collision resulting from a different user equipment, other than the user equipment, transmitting to the radio access network node the first random access channel preamble portion.

20. The non-transitory machine-readable medium of claim 14, wherein the first random access channel preamble portion and the second random access channel preamble portion are the same.

\* \* \* \* \*